US012066572B2

United States Patent
Regani et al.

(10) Patent No.: US 12,066,572 B2
(45) Date of Patent: Aug. 20, 2024

(54) METHOD, APPARATUS, AND SYSTEM FOR HUMAN IDENTIFICATION BASED ON HUMAN RADIO BIOMETRIC INFORMATION

(71) Applicants: Sai Deepika Regani, College Park, MD (US); Qinyi Xu, Mountain View, CA (US); Beibei Wang, Clarksville, MD (US); Min Wu, Clarksville, MD (US); Oscar Chi-Lim Au, San Jose, CA (US); K. J. Ray Liu, Potomac, MD (US)

(72) Inventors: Sai Deepika Regani, College Park, MD (US); Qinyi Xu, Mountain View, CA (US); Beibei Wang, Clarksville, MD (US); Min Wu, Clarksville, MD (US); Oscar Chi-Lim Au, San Jose, CA (US); K. J. Ray Liu, Potomac, MD (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 17/539,058

(22) Filed: Nov. 30, 2021

(65) Prior Publication Data
US 2022/0091231 A1 Mar. 24, 2022

Related U.S. Application Data

(60) Division of application No. 16/667,757, filed on Oct. 29, 2019, which is a continuation-in-part of
(Continued)

(51) Int. Cl.
*G01S 7/41* (2006.01)
*G01S 7/00* (2006.01)
(Continued)

(52) U.S. Cl.
CPC .............. *G01S 7/412* (2013.01); *G01S 7/006* (2013.01); *G01S 7/415* (2013.01); *G01S 13/003* (2013.01); *G06N 3/04* (2013.01); *G06F 2218/00* (2023.01)

(58) Field of Classification Search
CPC ........... G06K 9/00255; G06K 9/00268; G06K 9/00288; G06K 9/2054; G06K 9/4628;
(Continued)

(56) References Cited

U.S. PATENT DOCUMENTS

2012/0293356 A1* 11/2012 Barthel ................... G01S 7/539
367/93
2013/0113647 A1* 5/2013 Sentelle ................... G01V 3/12
342/22
(Continued)

FOREIGN PATENT DOCUMENTS

WO WO-2015102713 A2 * 7/2015 ........... A61B 5/0507
WO WO-2017089568 A1 * 6/2017 ............. G01S 15/06

OTHER PUBLICATIONS

Joint threshold adjustment and power allocation for cognitive target tracking in asynchronous radar network. IEEE Transactions on Signal Processing, 65(12), pp. 3094-3106.*
(Continued)

*Primary Examiner* — Zhitong Chen

(57) ABSTRACT

Methods, apparatus and systems for monitoring an object expression are described. In one example, a described apparatus in a venue comprises a receiver and a processor. The receiver is configured for: receiving a wireless signal from a transmitter through a wireless multipath channel that is impacted by an expression of an object in the venue, wherein the object has at least one movable part and is expressed in the expression with respect to a setup in the venue; and obtaining a time series of channel information (TSCI) of the wireless multipath channel based on the wireless signal
(Continued)

received by the receiver. The processor is configured for computing information associated with the object based at least partially on the TSCI obtained when the object is expressed in the expression, and performing, based on the information associated with the object, a task associated with at least one of the object and the venue.

19 Claims, 11 Drawing Sheets

Related U.S. Application Data application No. 16/127,151, filed on Sep. 10, 2018, now Pat. No. 11,012,285, which is a continuation-in-part of application No. PCT/US2017/021963, filed on Mar. 10, 2017, said application No. 16/667,757 is a continuation-in-part of application No. 16/127,092, filed on Sep. 10, 2018, now Pat. No. 10,476,730, which is a continuation-in-part of application No. PCT/US2017/021957, filed on Mar. 10, 2017, said application No. 16/667,757 is a continuation-in-part of application No. 16/125,748, filed on Sep. 9, 2018, now Pat. No. 10,833,912, which is a continuation-in-part of application No. PCT/US2017/015909, filed on Jan. 31, 2017, said application No. 16/667,757 is a continuation-in-part of application No. 15/861,422, filed on Jan. 3, 2018, now Pat. No. 11,025,475, and a continuation-in-part of application No. 16/200,608, filed on Nov. 26, 2018, now Pat. No. 10,735,298, and a continuation-in-part of application No. 16/200,616, filed on Nov. 26, 2018, now Pat. No. 10,495,725, and a continuation-in-part of application No. 16/446,589, filed on Jun. 19, 2019, now Pat. No. 10,742,475, which is a continuation-in-part of application No. 15/326,112, filed as application No. PCT/US2015/041037 on Jul. 17, 2015, said application No. 16/446,589 is a continuation-in-part of application No. 15/584,052, filed on May 2, 2017, now Pat. No. 10,447,094, said application No. 16/446,589 is a continuation-in-part of application No. 15/434,813, filed on Feb. 16, 2017, now Pat. No. 10,129,862, and a continuation-in-part of application No. 16/127,151, filed on Sep. 10, 2018, now Pat. No. 11,012,285, and a continuation-in-part of application No. 16/127,092, filed on Sep. 10, 2018, now Pat. No. 10,476,730, which is a continuation-in-part of application No. PCT/US2017/021957, filed on Mar. 10, 2017, said application No. 16/446,589 is a continuation-in-part of application No. PCT/US2017/027131, filed on Apr. 12, 2017, and a continuation-in-part of application No. 15/384,217, filed on Dec. 19, 2016, now Pat. No. 10,440,705, and a continuation-in-part of application No. 16/125,748, filed on Sep. 9, 2018, now Pat. No. 10,833,912, and a continuation-in-part of application No. 15/861,422, filed on Jan. 3, 2018, now Pat. No. 11,025,475, and a continuation-in-part of application No. 16/060,710, filed as application No. PCT/US2016/066015 on Dec. 9, 2016, now Pat. No. 10,380,881, said application No. 16/446,589 is a continuation-in-part of application No. 15/873,806, filed on Jan. 17, 2018, now Pat. No. 10,270,642, and a continuation-in-part of application No. 16/101,444, filed on Aug. 11, 2018, now Pat. No. 10,291,460, and a continuation-in-part of application No. 16/200,608, filed on Nov. 26, 2018, now Pat. No. 10,735,298, and a continuation-in-part of application No. 16/200,616, filed on Nov. 26, 2018, now Pat. No. 10,495,725, and a continuation-in-part of application No. 16/203,299, filed on Nov. 28, 2018, now Pat. No. 10,374,863, and a continuation-in-part of application No. 16/203,317, filed on Nov. 28, 2018, now Pat. No. 10,397,039, said application No. 16/667,757 is a continuation-in-part of application No. 15/326,112, filed as application No. PCT/US2015/041037 on Jul. 17, 2015.

(60) Provisional application No. 62/753,017, filed on Oct. 30, 2018, provisional application No. 62/806,688, filed on Feb. 15, 2019, provisional application No. 62/806,694, filed on Feb. 15, 2019, provisional application No. 62/846,686, filed on May 12, 2019, provisional application No. 62/846,688, filed on May 12, 2019, provisional application No. 62/849,853, filed on May 18, 2019, provisional application No. 62/331,278, filed on May 3, 2016, provisional application No. 62/734,224, filed on Sep. 20, 2018, provisional application No. 62/744,093, filed on Oct. 10, 2018, provisional application No. 62/868,782, filed on Jun. 28, 2019, provisional application No. 62/873,781, filed on Jul. 12, 2019, provisional application No. 62/900,565, filed on Sep. 15, 2019, provisional application No. 62/902,357, filed on Sep. 18, 2019.

(51) Int. Cl.
*G01S 13/00* (2006.01)
*G06N 3/04* (2023.01)

(58) Field of Classification Search
CPC .. G06K 9/6257; G06K 9/6274; G06K 9/6277; G06N 3/0454; G06N 3/08; G06N 3/084; G06N 7/005
See application file for complete search history.

(56) References Cited

U.S. PATENT DOCUMENTS

| | | | | |
|---|---|---|---|---|
| 2015/0019131 | A1* | 1/2015 | Basir | G01C 21/26 701/526 |
| 2016/0001781 | A1* | 1/2016 | Fung | G16H 50/20 701/36 |
| 2016/0320853 | A1* | 11/2016 | Lien | G06F 3/017 |

OTHER PUBLICATIONS

Chen, Y., Han, F., Yang, Y.H., Ma, H., Han, Y., Jiang, C., Lai, H.Q., Claffey, D., Safar, Z. and Liu, K.R., 2014. Time-reversal wireless paradigm for green internet of things: An overview. IEEE Internet of Things Journal, 1(1), pp. 81-98.*
Yan, J., Liu, H., Pu, W., Liu, H., Liu, Z. and Bao, Z., 2017. Joint threshold adjustment and power allocation for cognitive target tracking in asynchronous radar network. IEEE Transactions on Signal Processing, 65(12), pp. 3094-3106.*

\* cited by examiner

METHOD, APPARATUS, AND SYSTEM FOR HUMAN IDENTIFICATION BASED ON HUMAN RADIO BIOMETRIC INFORMATION

CROSS-REFERENCE TO RELATED APPLICATIONS

The present application is a Divisional application of U.S. patent application Ser. No. 16/667,757, filed on Oct. 29, 2019, which incorporated by reference the entirety of the disclosures of, and claimed priority to, each of the following cases:

(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/127,092, entitled "METHODS, APPARATUS, SERVERS, AND SYSTEMS FOR HUMAN IDENTIFICATION BASED ON HUMAN RADIO BIOMETRIC INFORMATION", filed on Sep. 10, 2018,
  (1) Which is a continuation-in-part of PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
(d) U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
  (1) which is a continuation-in-part of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
(e) U.S. patent application Ser. No. 15/861,422, entitled "METHOD, APPARATUS, SERVER, AND SYSTEMS OF TIME-REVERSAL TECHNOLOGY", filed on Jan. 3, 2018,
(f) U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018,
(g) U.S. patent application Ser. No. 16/200,608, entitled "METHOD, APPARATUS, SERVER AND SYSTEM FOR VITAL SIGN DETECTION AND MONITORING", filed on Nov. 26, 2018,
(h) U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018,
(i) U.S. Provisional Patent application 62/806,688, entitled "METHOD, APPARATUS, AND SYSTEM FOR WIRELESS GAIT RECOGNITION", filed on Feb. 15, 2019,
(j) U.S. Provisional Patent application 62/806,694, entitled "METHOD, APPARATUS, AND SYSTEM FOR OUTDOOR TARGET TRACKING", filed on Feb. 15, 2019,
(k) U.S. Provisional Patent application 62/846,686, entitled "METHOD, APPARATUS, AND SYSTEM FOR WIRELESS INERTIAL MEASUREMENT", filed on May 12, 2019,
(l) U.S. Provisional Patent application 62/846,688, entitled "Method, Apparatus, and System for Processing and Presenting Life Log based on a Wireless Signal", filed on May 12, 2019,
(m) U.S. Provisional Patent application 62/849,853, entitled "Method, Apparatus, and System for Wireless Artificial Intelligent in Smart Car", filed on May 18, 2019,
(n) U.S. patent application Ser. No. 16/446,589, entitled "METHOD, APPARATUS, AND SYSTEM FOR OBJECT TRACKING AND SENSING USING BROADCASTING", filed on Jun. 19, 2019,
  (1) which is a Continuation-in-Part of U.S. patent application Ser. No. 15/326,112, entitled "WIRELESS POSITIONING SYSTEMS", filed on Jan. 13, 2017,
    a. which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
  (2) which is a Continuation-in-Part of U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
    a. which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
  (3) which is a Continuation-in-Part of U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017, issued as U.S. Pat. No. 10,129,862 on Nov. 13, 2018,
  (4) which is a Continuation-in-Part of U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
    a. which is a national stage entry of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017, (5) which is a Continuation-in-Part of U.S. patent application Ser. No. 16/127,092, entitled "METHODS, APPARATUS, SERVERS, AND SYSTEMS FOR HUMAN IDENTIFICATION BASED ON HUMAN RADIO BIOMETRIC INFORMATION", filed on Sep. 10, 2018, a. which is a continuation-in-part of PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017, (6) which is a Continuation-in-Part of PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017, (7) which is a Continuation-in-Part of U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017, (8) which is a Continuation-in-Part of U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018, a. which is a national stage entry of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017, (9) which is a Continuation-in-Part of U.S. patent application Ser. No. 15/861,422, entitled "METHOD, APPARATUS, SERVER, AND SYSTEMS OF TIME-REVERSAL TECHNOLOGY", filed on Jan. 3, 2018,

(10) which is a Continuation-in-Part of U.S. patent application Ser. No. 16/060,710, entitled "METHOD, APPARATUS, AND SYSTEMS FOR WIRELESS EVENT DETECTION AND MONITORING", filed on Jun. 8, 2018, a. which is a national stage entry of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017,

(11) which is a Continuation-in-Part of U.S. patent application Ser. No. 15/873,806, entitled "METHOD, APPARATUS, AND SYSTEM FOR OBJECT TRACKING AND NAVIGATION", filed on Jan. 17, 2018, issued as U.S. Pat. No. 10,270,642 on Apr. 23, 2019,

(12) which is a Continuation-in-Part of U.S. patent application Ser. No. 16/101,444, entitled "METHOD, APPARATUS, AND SYSTEM FOR WIRELESS MOTION MONITORING", filed on Aug. 11, 2018, issued as U.S. Pat. No. 10,291,460 on May 14, 2019,

(13) which claims priority to U.S. Provisional Patent application 62/734,224, entitled "METHOD, APPARATUS, AND SYSTEM FOR WIRELESS SLEEP MONITORING", filed on Sep. 20, 2018,

(14) which claims priority to U.S. Provisional Patent application 62/744,093, entitled "METHOD, APPARATUS, AND SYSTEM FOR WIRELESS PROXIMITY AND PRESENCE MONITORING", filed on Oct. 10, 2018,

(15) which claims priority to U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018,

(16) which is a Continuation-in-Part of U.S. patent application Ser. No. 16/200,608, entitled "METHOD, APPARATUS, SERVER AND SYSTEM FOR VITAL SIGN DETECTION AND MONITORING", filed on Nov. 26, 2018,

(17) which is a Continuation-in-Part of U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018,

(18) which is a Continuation-in-Part of U.S. patent application Ser. No. 16/203,299, entitled "APPARATUS, SYSTEMS AND METHODS FOR EVENT RECOGNITION BASED ON A WIRELESS SIGNAL", filed on Nov. 28, 2018,

(19) which is a Continuation-in-Part of U.S. patent application Ser. No. 16/203,317, entitled "APPARATUS, SYSTEMS AND METHODS FOR FALL-DOWN DETECTION BASED ON A WIRELESS SIGNAL", filed on Nov. 28, 2018,

(20) which claims priority to U.S. Provisional Patent application 62/806,688, entitled "METHOD, APPARATUS, AND SYSTEM FOR WIRELESS GAIT RECOGNITION", filed on Feb. 15, 2019,

(21) which claims priority to U.S. Provisional Patent application 62/806,694, entitled "METHOD, APPARATUS, AND SYSTEM FOR OUTDOOR TARGET TRACKING", filed on Feb. 15, 2019,

(22) which claims priority to U.S. Provisional Patent application 62/846,686, entitled "METHOD, APPARATUS, AND SYSTEM FOR WIRELESS INERTIAL MEASUREMENT", filed on May 12, 2019,

(23) which claims priority to U.S. Provisional Patent application 62/846,688, entitled "Method, Apparatus, and System for Processing and Presenting Life Log based on a Wireless Signal", filed on May 12, 2019,

(24) which claims priority to U.S. Provisional Patent application 62/849,853, entitled "Method, Apparatus, and System for Wireless Artificial Intelligent in Smart Car", filed on May 18, 2019, (o) U.S. Provisional Patent application 62/868,782, entitled "METHOD, APPARATUS, AND SYSTEM FOR VITAL SIGNS MONITORING USING HIGH FREQUENCY WIRELESS SIGNALS", filed on Jun. 28, 2019, (p) U.S. Provisional Patent application 62/873,781, entitled "METHOD, APPARATUS, AND SYSTEM FOR IMPROVING TOPOLOGY OF WIRELESS SENSING SYSTEMS", filed on Jul. 12, 2019, (q) U.S. Provisional Patent application 62/900,565, entitled "QUALIFIED WIRELESS SENSING SYSTEM", filed on Sep. 15, 2019, (r) U.S. Provisional Patent application 62/902,357, entitled "METHOD, APPARATUS, AND SYSTEM FOR AUTOMATIC AND OPTIMIZED DEVICE-TO-CLOUD CONNECTION FOR WIRELESS SENSING", filed on Sep. 18, 2019.

TECHNICAL FIELD

The present teaching generally relates to human identification and motion detection. More specifically, the present teaching relates to identifying the authorized driver in a car by recognizing his/her radio biometrics, and detecting human motion present indoors, based on wireless channel information in a rich-scattering environment.

BACKGROUND

Automobiles have become an essential part of everyday lives. In the era of Internet of Things (IoT), by deploying tremendous connected smart devices and analyzing the gathered data, IoT enables evolutionary changes in every aspect of people's daily life, including the emerging smart automobiles. One of the important and interesting aspects of smart automobiles is driver authentication which enables automatic adjustment of internal settings in automobiles such as seat and mirror positions, temperature etc., which are specific to an individual and can be operated without the need for a key.

Traditional approaches such as fingerprint matching, face recognition, iris technology and many more, mostly utilize techniques of image processing or computer vision to identify people. Human identification has also been done by observing the gait of a person, which is inapplicable in cars. All these techniques require video or images taken from a camera to perform human identification and have the drawback of potential privacy leakage.

SUMMARY

The present teaching generally relates in-car driver authentication and indoor motion detection. More specifically, the present teaching relates to 1) identifying and recognizing the radio biometrics of the driver in a car, and 2) monitoring existent motion and its strength based on time-reversal technology in a rich-scattering environment, e.g. a closed automobile environment, an indoor environment or urban metropolitan area, enclosed environment, underground environment, etc.

In one embodiment, an apparatus in a venue for monitoring an object expression is described. The apparatus comprises: a receiver and a processor. The receiver is configured for: receiving a wireless signal from a transmitter through a wireless multipath channel that is impacted by an expression of an object in the venue, wherein the object has at least one movable part and is expressed in the expression with respect to a setup in the venue; and obtaining a time series of channel information (TSCI) of the wireless multipath channel based on the wireless signal received by the receiver. The processor is configured for computing information associated with the object based at least partially on the TSCI obtained when the object is expressed in the expression, and performing, based on the information associated with the object, a task associated with at least one of the object and the venue.

In one embodiment, the expression comprises at least one of: an anticipated expression, a controlled expression, a pre-determined expression, a designated expression, a targeted expression, a predicted expression, and an expected expression. In one embodiment, the expression represents at least one of: a place in the venue, an identifiable place, a region, area, spatial coordinate, orientation, presentation, manifestation, dynamic expression, motion, static expression, positioning, scale, placement, state, gesture, pose, posture, body language, body expression, head expression, face expression, vocal expression, arm expression, hand expression, leg expression, and a sequence of expressions of the object.

In another embodiment, a system for monitoring an object expression is described. The system comprises: a first transceiver, a second transceiver, and a processor. The first transceiver is configured for transmitting a wireless signal through a wireless multipath channel that is impacted by an expression of an object in a venue, wherein the object has at least one movable part and is expressed in the expression with respect to a setup in the venue. The second transceiver is configured for: receiving the wireless signal through the wireless multipath channel, and obtaining a time series of channel information (TSCI) of the wireless multipath channel based on the wireless signal. The processor is configured for: computing information associated with the object based at least partially on the TSCI obtained when the object is expressed in the expression, performing an analysis of at least one of the TSCI and the information associated with the object, and performing, based on the analysis, a task associated with at least one of the object and the venue.

In yet another embodiment, a method, implemented by a processor, a memory communicatively coupled with the processor, and a set of instructions stored in the memory to be executed by the processor for monitoring an object expression, is described. The method comprises: obtaining a time series of channel information (TSCI) of a wireless multipath channel based on a wireless signal, wherein the wireless signal is transmitted from a first wireless device to a second wireless device through the wireless multipath channel that is impacted by an expression of an object in a venue, the object has at least one movable part and is expressed in the expression with respect to a setup in the venue; computing information associated with the object based at least partially on the TSCI obtained when the object is expressed in the expression; and performing, based on the information associated with the object, a task associated with at least one of the object and the venue. The expression represents at least one of: a place in the venue, an identifiable place, a region, area, spatial coordinate, orientation, presentation, manifestation, dynamic expression, motion, static expression, positioning, scale, placement, state, gesture, pose, posture, body language, body expression, head expression, face expression, vocal expression, arm expression, hand expression, leg expression, and a sequence of expressions of the object.

Other concepts relate to software for implementing the present teaching on human identification based on time-reversal technology in a rich-scattering environment. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
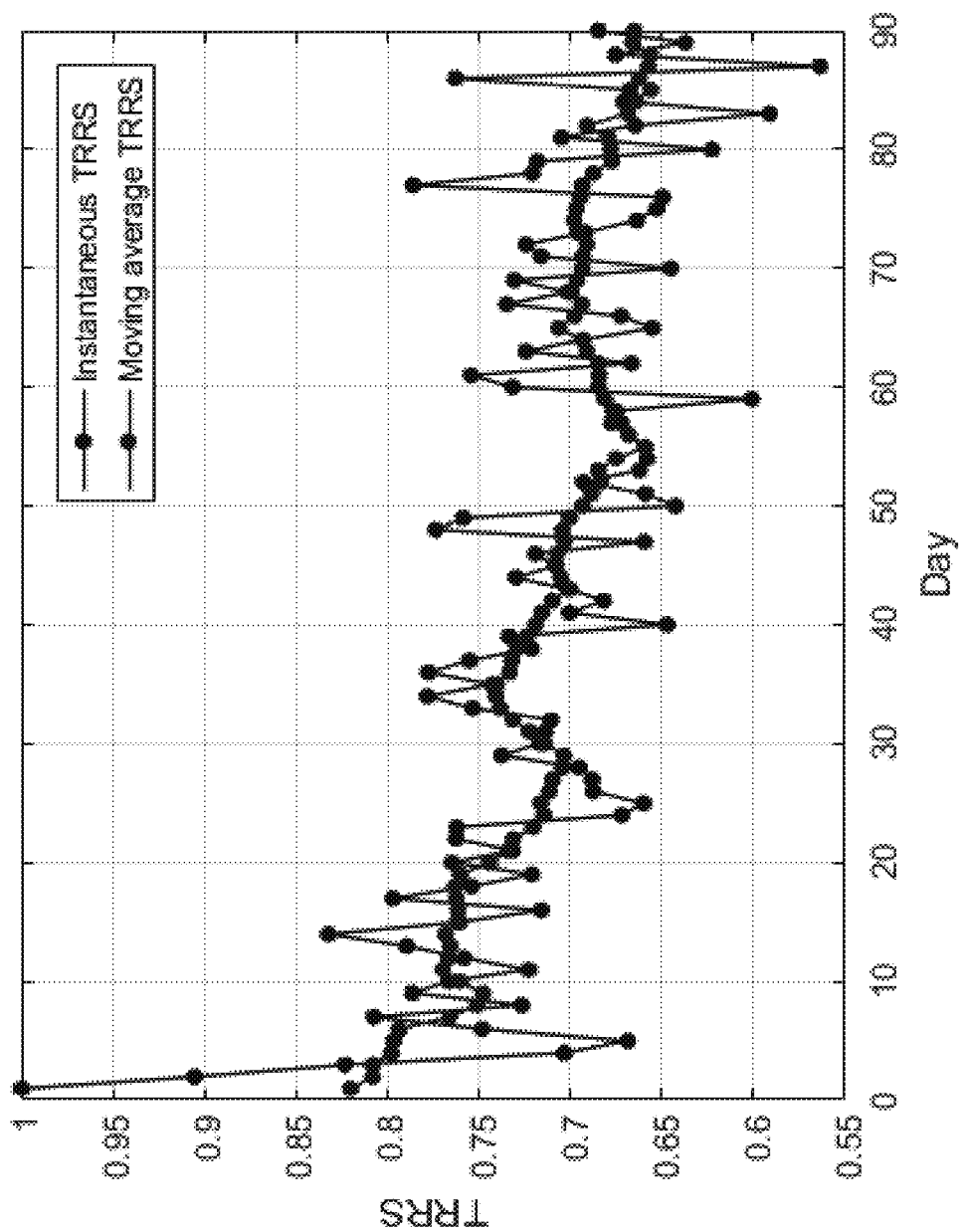
FIG. 1 illustrates exemplary experimental results of the time reversal resonating strength (TRRS) values between the Day 0 environment and the subsequent environments recorded in 90 days in a car, according to some embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, the present teaching discloses a method, apparatus, device, system, and/or software (method/apparatus/device/system/software) of a wireless monitoring system. A time series of channel information (CI) of a wireless multipath channel (channel) may be obtained using a processor, a memory communicatively coupled with the processor and a set of instructions stored in the memory. The time series of CI (TSCI) may be extracted from a wireless signal (signal) transmitted between a Type 1 heterogeneous wireless device (Type 1 device, or TX device) and a Type 2 heterogeneous wireless device (Type 2 device, or RX device) in a venue through the channel. The channel may be impacted by a motion (or movement or a change/variation in position/location) of an object in the venue. A characteristics and/or a spatial-temporal information (e.g. motion information) of the object and/or of the motion of an object may be monitored based on the TSCI. A task may be performed based on the characteristics and/or the spatial-temporal information (e.g. motion information). A presentation associated with the task may be generated in a user-interface (UI) on a device of a user. The TSCI may be preprocessed.

The wireless signal may comprise: transmitted signal, received signal of the transmitted wireless signal, time series of probe signals, RF signal, RF transmission, baseband signal, downlink signal, uplink signal, broadcast signal, bandlimited signal, standard compliant signal, wireless standard compliant signal, protocol signal, wireless communication network signal, cellular network signal, WiFi signal, LTE/5G/6G/7G signal, beacon signal, beacon wireless signal, reference signal, source signal, wireless source signal, motion probes, motion detection signal, motion sensing signal and/or synchronization signal.

The wireless multipath channel may comprise: a channel of wireless communication network (e.g. WLAN, WiFi, wireless mesh network), cellular communication network (e.g. LTE/5G), ultra-wideband (UWB) network, microwave network, a frequency channel (e.g. in WiFi/LTE/5G), a coded channel (e.g. in CDMA), and/or another system. It may comprise more than one "consecutive" channels (perhaps heterogeneous, e.g. a WiFi channel and a UWB channel) whose frequency bands overlap. It may also comprise more than one non-consecutive channels (e.g. a WiFi channel at 2.4 GHz and a WiFi channel at 5 GHz) whose frequency bands are disjoint (i.e. do not overlap).

The Type 1 device may comprise: transmitter, RF interface, RF transmitter subsystem, TX device, transceiver, "Origin Satellite", broadcasting device, source device, hub device, wireless source device, wireless communication device, and/or receiver. The Type 1 device or the TX device may have one or more radio, e.g. a 2.4 GHz radio, a 5 GHz radio, a front haul radio, a backhaul radio. It may be a mesh router. The Type 1 device may comprise a modem. The Type 1 device may comprise RF front end and/or RF/radio chip to send the wireless signal. The Type 1 device may transmit the wireless signal to the Type 2 device and communicate wireless (and/or cellular) network traffic in another channel in parallel. The Type 1 device may be a wireless (and/or cellular) access point (WAP) device.

The Type 2 device may comprise: receiver, RF interface, RF receiver subsystem, RX device, transceiver, "Tracker Bot", receiver of broadcasting service (e.g. of the Type 1 device), sensor device, remote sensor device, wireless sensor device, wireless communication device, destination device, hub device, target device, motion detection device, and/or transmitter. The Type 2 device may comprise RF front end and/or RF/radio chip to receive the wireless signal. The Type 2 device may passively observe/monitoring the wireless signal (and/or wireless/cellular communication network signals, wireless/cellular signals exchanged, etc.) from the Type 1 device without establishing connection with or requesting service from the Type 1 device (and/or the wireless communication network). In an example, the Type 1 device may be communicating with another wireless device(s) (e.g. in the venue). The Type 1 device may send/communicate the wireless signal (and/or wireless/cellular communication network signals, wireless/cellular signals exchanged, etc.) during communication with the another device(s), and the Type 2 device may monitor the communication (and/or wireless/cellular communication network signals, wireless/cellular signals exchanged, etc.) passively to obtain TSCI of the channel between the Type 1 device and the Type 2 device. The Type 2 device may obtain/store/retrieve/access/preprocess/condition/process/analyze/monitor/apply the TSCI. The Type 2 device may comprise a modem. The Type 2 device may receive the wireless signal from the Type 1 device and communicate wireless (and/or cellular) network traffic in another channel in parallel. The Type 2 device may be a wireless (and/or cellular) access point (WAP) device.

The Type 1 device (e.g. TX device) may function as/play the role of Type 2 device (e.g. RX device) temporarily, sporadically, continuously, repeatedly, simultaneously, concurrently, and/or contemporaneously, and vice versa. A device may function as Type 1 device and/or a Type 2 device temporarily, sporadically, simultaneously, concurrently, and/or contemporaneously.

The task may be performed passively and/or actively. It may be passive because the user may not need to carry any wearables (i.e. the Type 1 device and the Type 2 device are not wearable devices that the user need to carry in order perform the task). It may be active because the user may carry a device (e.g. the Type 1 device, the Type 2 device, a device communicatively coupled with either the Type 1 device or the Type 2 device). The presentation may be visual, audio, image, video, animation, graphical presentation, text, etc. A computation of the task may be performed by a processor of the Type 1 device, a processor of an IC of the Type 1 device, a processor of the Type 2 device, a processor of an IC of the Type 2 device, a local server, a cloud server, a data analysis subsystem, a signal analysis subsystem, and/or another processor.

The TSCI may be extracted from a derived signal (e.g. baseband signal, motion detection signal, motion sensing signal) derived from the wireless signal (e.g. RF signal). The derived signal may comprise a packet with a header and a payload. The probe signal may reside in the header and/or the payload. The motion detection signal and/or motion sensing signal may be recognized/identified base on the header. The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network, etc.) may be used to store the TSCI, characteristics, spatial-temporal information, signatures, patterns, behaviors, trends, parameters, analytics, identification information, user information, device information, channel information, venue (e.g. map, network, proximity devices/networks) information, task information, class/category information, presentation (e.g. UI) information, and/or other information.

The Type 1 device (TX device) may comprise at least one heterogeneous wireless transmitter. The Type 2 device (RX device) may comprise at least one heterogeneous wireless receiver. The Type 1 device and the Type 2 device may be the same device. Any device may have a data processing unit/apparatus, a computing unit/system, a network unit/system, a processor, a memory communicatively coupled with the processor, and a set of instructions stored in the memory to be executed by the processor. Some processors, memories and sets of instructions may be coordinated.

There may be multiple Type 1 devices interacting with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, spatial-temporal information and/or another quantity of the object may be monitored based on the second TSCI. The Type 1 device and the Type 2 device may be the same. The characteristics, spatial-temporal information and/or another quantity with different time stamps may form a waveform. The waveform may be displayed in the presentation.

The wireless signal and/or another signal may have data embedded. The wireless signal may be a series of probe signals (e.g. a repeated transmission of probe signals). The probe signals may change/vary over time. A probe signal may be a standard compliant signal, protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the spatial-temporal information (e.g. motion information), initial spatial-temporal information, initial time, direction, instantaneous location, instantaneous angle, and/or speed, of the object.

The processor, the memory and/or the set of instructions may be associated with the Type 1 heterogeneous wireless transceiver, one of the at least one Type 2 heterogeneous wireless transceiver, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (connection) with any Type 2 device, and without any Type 2 device requesting services from the Type 1 device.

The Type 1 device may transmit to a particular media access control (MAC) address common for more than one Type 2 devices. Each Type 2 device may adjust its MAC address to the particular MAC address.

The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device.

The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection with any Type 2 device. The Type 1 device may reply to the third special signal by transmitting a fourth handshake signal to the another device.

The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device.

The another device may not communicate (or suspend communication) with the Type 1 device after establishing connection with the Type 1 device. Suspended communication may be resumed. The another device may enter an inactive mode, hibernation mode, sleep mode, standby mode, low-power mode, OFF mode and/or power-down mode, after establishing the connection with the Type 1 device.

The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device.

Some first Type 2 device(s) and some second Type 2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%, etc.). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5, etc.) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices.

A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals.

In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or spatial-temporal information (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system, etc.). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events.

For each of the multiple known events happening in the venue in a respective training time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed.

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may also be applied to associate the current event with a known event, a class/category/group/grouping/list/set of known events, an unknown event, a class/category/group/grouping/list/set of unknown events, and/or another event/class/category/group/grouping/list/set.

Each TSCI may comprise at least one CI each associated with a respective timestamp.

Two TSCI associated with two Type 2 devices may be different with different: starting time, duration, stopping time, amount of CI, sampling frequency, sampling period. Their CI may have different features.

The first and second Type 1 devices may be at same location in the venue. They may be the same device.

The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device.

The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device.

The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed.

The first section may comprise a first segment (e.g. subset) of the first TSCI with a first starting/ending time, and/or another segment (e.g. subset) of a processed first TSCI. The processed first TSCI may be the first TSCI processed by a first operation.

The second section may comprise a second segment (e.g. subset) of the second TSCI with a second starting time and a second ending time, and another segment (e.g. subset) of a processed second TSCI. The processed second TSCI may be the second TSCI processed by a second operation.

The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many.

At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration.

A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section.

A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1−D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. F(X, Y, . . . )) with at least two arguments: X and Y.

The two arguments may be scalars. The function (e.g. F) may be a function of at least one of: X, Y, (X−Y), (Y−X), abs(X−Y), X^a, Y^b, abs(X^a−Y^b), (X−Y)^a, (X/Y), (X+a)/(Y+b), (X^a/Y^b), and ((X/Y)^a−b), wherein a and b are may be some predetermined quantities. For example, the function may simply be abs(X−Y), or (X−Y)^2, (X−Y)^4. The function may be a robust function. For example, the function may be (X−Y)^2 when abs(X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative.

In another example, both arguments X and Y may be n-tuples such that X=(x_1, x_2, . . . x_n) and Y=(y_1, y_2, . . . , y_n). The function may be a function of at least one of: x_i, y_i, (x_i−y_i), (y_i−x_i), abs(x_i−y_i), x_i^a, y_i^b, abs(x_i^a−y_i^b), (x_i−y_i)^a, (x_i/y_i), (x_i+a)/(y_i+b), (x_i^a/y_i^b), and ((x_i/y_i)^a−b), wherein i is a component index of the n-tuple X and Y, and 1<=i<=n. E.g. component index of x_1 is i=1, component index of x_2 is i=2.

The function may comprise a component-by-component summation of another function of at least one of the following: x_i, y_i, (x_i−y_i), (y_i−x_i), abs(x_i−y_i), x_i^a, y_i^b, abs(x_i^a−y_i^b), (x_i−y_i)^a, (x_i/y_i), (x_i+a)/(y_i+b), (x_i^a/y_i^b), and ((x_i/y_i)^a−b), wherein i is the component index of the n-tuple X and Y. For example, the function may be in a form of sum_{i=1}^n (abs(x_i/y_i)−1)/n, or sum_{i=1}^n w_i*(abs(x_i/y_i)−1), where w_i is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the i^{th} domain item is mapped to the j^{th} range item. The constraint may be on admissible combination of i and j (constraint on relationship between i and j).

Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp.

A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost.

The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%). In another example, the current event may be associated with a known event that achieve smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost.

The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2.

The current event may be associated with at least one of: the known event, the unknown event and/or the another event, based on the mismatch cost and additional mismatch cost associated with at least one additional section of the first TSCI and at least one additional section of the second TSCI.

The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one events, and/or the current TSCI, for the classifier.

The classifier of the at least one event may be trained based on the projection and the training TSCI associated with the at least one event. The at least one current TSCI may be classified/categorized based on the projection and the current TSCI.

The projection may be re-trained using at least one of: the dimension reduction method, and another dimension reduction method, based on at least one of: the training TSCI, at least one current TSCI before retraining the projection, and/or additional training TSCI.

The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method, The classifier of the at least one event may be re-trained based on at least one of: the re-trained projection, the training TSCI associated with the at least one events, and/or at least one current TSCI.

The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values.

Each training TSCI may be weighted in the training of the projection.

The projection may comprise more than one projected components. The projection may comprise at least one most significant projected component. The projection may comprise at least one projected component that may be beneficial for the classifier.

Channel/Channel Information/Venue/Spatial-Temporal Info/Motion/Object

The channel information (CI) may be associated with/may comprise signal strength, signal amplitude, signal phase, spectral power measurement, modem parameters (e.g. used in relation to modulation/demodulation in digital communication systems such as WiFi, 4G/LTE, etc.), radio state (e.g. used in digital communication systems to decode digital data, baseband processing state, RF processing state, etc.), digital setting, gain setting, RF filter setting, RF front end switch setting, DC offset setting, DC correction setting, IQ compensation setting, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel.

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem).

The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc.

The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc.

Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/spatial-temporal information of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristics of a component-feature time series of a TSCI may be computed. The component-wise characteristics may be a scalar (e.g. energy) or a function with a domain and a range (e.g. an autocorrelation function, transform, inverse transform). The characteristics/spatial-temporal information of the motion of the object may be monitored based on the component-wise characteristics.

A total characteristics (e.g. aggregate characteristics) of the TSCI may be computed based on the component-wise characteristics of each component time series of the TSCI. The total characteristics may be a weighted average of the component-wise characteristics. The characteristics/spatial-temporal information of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock.

An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or spatial-temporal information (e.g. motion information) may comprise: location, location coordinate, change in location, position (e.g. initial position, new position), position on map, height, horizontal location, vertical location, distance, displacement, speed, acceleration, rotational speed, rotational acceleration, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, change in frequency, change in timing, change of gait cycle, timing, starting time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, motion statistics, motion parameter, indication of motion detection, motion magnitude, motion phase, similarity score, distance score, Euclidean distance, weighted distance, $L\_1$ norm, $L\_2$ norm, $L\_k$ norm for $k>2$, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting location, ending location, starting quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, and/or another information. The processor shares computational workload with the Type 1 heterogeneous wireless device and Type 2 heterogeneous wireless device.

The Type 1 device and/or Type 2 device may be a local device. The local device may be: a smart phone, smart device, TV, sound bar, set-top box, access point, router, repeater, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc.

The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device.

The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable.

The portable device, the nearby device, a local server (e.g. hub device) and/or a cloud server may share the computation and/or storage for a task (e.g. obtain TSCI, determine characteristics/spatial-temporal information of the object associated with the movement (e.g. change in position/location) of the object, computation of time series of power (e.g. signal strength) information, determining/computing the particular function, searching for local extremum, classification, identifying particular value of time offset, de-noising, processing, simplification, cleaning, wireless sensing task, extract CI from signal, switching, segmentation, estimate trajectory, process the map, correction, corrective adjustment, adjustment, map-based correction, detecting error, checking for boundary hitting, thresholding, etc.) and information (e.g. TSCI).

The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device.

The nearby device and/or at least one processor associated with the wireless receiver, the wireless transmitter, the another wireless receiver, the another wireless transmitter and/or a cloud server (in the cloud) may determine the initial spatial-temporal information of the object. Two or more of them may determine the initial spatial-temporal info jointly. Two or more of them may share intermediate information in the determination of the initial spatial-temporal information (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial spatial-temporal information (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known.

In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a room, house, office, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee, etc.). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identifier (ID) or identity as described above.

A event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball, etc.), two-body action (e.g. a person letting go a balloon, catching a fish, molding a clay, writing a paper, person typing on a computer, etc.), car moving in a garage, person carrying a smart phone and walking around an airport/mall/government building/office/etc., autonomous moveable object/machine moving around (e.g. vacuum cleaner, utility vehicle, car, drone, self-driving car, etc.).

The task or the wireless smart sensing task may comprise: object detection, presence detection, object recognition, object verification, object counting, tool detection, tool recognition, tool verification, machine detection, machine recognition, machine verification, human detection, human recognition, human verification, baby detection, baby recognition, baby verification, human breathing detection, motion detection, motion degree estimation, motion estimation, motion verification, periodic motion detection, periodic motion estimation, periodic motion verification, repeated motion detection/estimation/verification, stationary motion detection, stationary motion estimation, stationary motion verification, cyclo-stationary motion detection, cyclo-stationary motion estimation, cyclo-stationary motion verification, transient motion detection, transient motion estimation, transient motion verification, trend detection, trend estimation, trend verification, breathing detection, breathing estimation, breathing estimation, human biometrics detection, human biometrics estimation, human biometrics verification, environment informatics detection, environment informatics estimation, environment informatics verification, gait detection, gait estimation, gait verification, gesture detection, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, irregularity detection, locationing, tracking, multiple object tracking, indoor tracking, indoor position, indoor navigation, power transfer, wireless power transfer, object counting, car tracking in parking garage, patient detection, patient monitoring, patient verification, activating a device/system (e.g. security system, alarm, siren, speaker, camera, heater/air-conditioning (HVAC) system, coffee machine, cooking device, cleaning device, housekeeping device, etc.), wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device.

A first part of the task may comprise at least one of: preprocessing, signal conditioning, signal processing, post-processing, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room, etc.), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system, etc.).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination, etc.) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc.

Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio.

The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination.

The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination.

The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art.

The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text, etc.), symbolic way (e.g. emoticon, signs, hand gesture, etc.), or mechanical way (e.g. vibration, actuator movement, haptics, etc.).

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics, daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or spatial-temporal information to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained (with argument within constraint) maximum, minimum, constrained maximum, constrained minimum, constrained extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude, etc.) of the local maximum over the same quantity of the local minimum. It may also be the function of a difference between the quantity of the local maximum and the same quantity of the local minimum.

Significant local peaks may be identified or selected. Each significant local peak may be a local maximum with SNR-like parameter greater than a threshold T1 and/or a local maximum with amplitude greater than a threshold T2.

The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/spatial-temporal information of the object may be computed based on the set of selected significant local peaks and frequency values associated with the set of selected significant local peaks.

In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or spatial-temporal information may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter, etc.) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/spatial-temporal information/size/property/trait/habit/behavior, the venue, feature/fixture/furniture/barrier/material/machine/living thing/thing/object/boundary/surface/medium that is in/at/of the venue, map, constraint of the map, the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of: error, aggregate error, component error, error in projection domain, error in selected axes, error in selected orthogonal axes, absolute error, square error, absolute deviation, square deviation, higher order error (e.g. third order, fourth order, etc.), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation, etc. Error associated with different links may have different weights. One possibility is that some links and/or some components with larger noise or lower signal quality metric may have smaller or bigger weight), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or spatial-temporal information of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or spatial-temporal information of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map of the venue. The information may comprise: location, zone, region, area, corrected location, approximate location, location with respect to (w.r.t.) a map of the venue, location w.r.t. a segmentation of the venue, direction, a path, a path w.r.t. the map and/or the segmentation, a trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), a history of a path, approximate regions/zones along a path, a history/summary of past locations, a history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, an identity (ID) or identifier of the respect object (e.g. a pet, a person, an self-guided machine/device, a vehicle, a drone, a car, a boat, a bicycle, a self-guided vehicle, a machine with a fan, an air-conditioner, a TV, a machine with a movable part), an identification of a user (e.g. a person), an information of the user, a location/speed/acceleration/direction/motion/gesture/gesture control/motion trace of the user, an ID or identifier of the user, an activity of the user, a state of the user, a sleeping/resting characteristics of the user, an emotional state of the user, a vital sign of the user, an environment information of the venue, a weather information of the venue, an earthquake, an explosion, a storm, a rain, a fire, a temperature, a collision, an impact, a vibration, an event, a door-open event, a door-close event, a window-open event, a window-close event, a fall-down event, a burning event, a freezing event, a water-related event, a wind-related event, an air-movement event, an accident event, a pseudo-periodic event (e.g. running on a treadmill, jumping up and down, skipping rope, somersault, etc.), a repeated event, a crowd event, a vehicle event, a gesture of the user (e.g. a hand gesture, an arm gesture, a foot gesture, a leg gesture, a body gesture, a head gesture, a face gesture, a mouth gesture, an eye gesture, etc.).

The location may be 2-dimensional (e.g. with 2D coordinates), 3-dimensional (e.g. with 3D coordinates). The location may be relative (e.g. w.r.t. a map) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/ state/status/action/motion of a user, temperature, network traffic, network connectivity, a status of a device/machine, remaining power of a device, a status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map may be 2-dimensional, 3-dimensional and/or higher-dimensional. (e.g. a time varying 2D/3D map) Walls, windows, doors, entrances, exits, forbidden areas may be marked on the map. The map may comprise floor plan of a facility. The map may have one or more layers (overlays). The map may be a maintenance map comprising water pipes, gas pipes, wiring, cabling, air ducts, crawl-space, ceiling layout, and/or underground layout.

The venue may be segmented/subdivided/zoned/grouped into multiple zones/regions/geographic regions/sectors/sections/territories/districts/precincts/localities/neighborhoods/ areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/ areas may be presented in a map. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Washington Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.).

Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory, etc.) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain either the Type 1 transceiver and the Type 2 transceiver. The hardware modules may be sold to/used by variable brands to design, build and sell final commercial products. Products using the disclosed system and/or method may be home/ office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise at least one of: an analytics, a selected time window, a subsampling, a transform, a projection, etc. The presenting may comprise presenting at least one of: a monthly view, a weekly view, a daily view, a simplified view, a detailed view, a cross-sectional view, a small form-factor view, a large form-factor view, a color-coded view, a comparative view, a summary view, an animation, a web view, a voice announcement, and another presentation related to the periodic or repetition characteristics of the repeating motion.

A Type 1 device and/or a Type 2 device may be an antenna, a device with antenna, a device with a housing (e.g. for radio, antenna, data/signal processing unit, wireless IC, circuits, etc.), device that has interface to attach/connect to/link antenna, device that is interfaced to/attached to/connected to/linked to another device/system/computer/phone/ network/data aggregator, device with a user interface (UI)/ graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant, etc.), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/ LTE/5G/6G/7G, UMTS, 3GPP, GSM, EDGE, TDMA, FDMA, CDMA, WCDMA, TD-SCDMA, etc.), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip, etc.), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system, etc.), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc.

In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment.

All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

The procedure of recording a radio signature is called radio shot. The similarity of two channel state information (CSIs) can be defined by the TRRS. For two Channel Frequency Responses (CFRs) $h_1$ and $h_2$, the TRRS in the frequency domain is given by:

$$TRRS(h_1, h_2) = \frac{\max_\phi \left| \sum_{k=0}^{L-1} h_1[k] h_2[k]^* e^{jk\phi} \right|^2}{\left( \sum_{l=0}^{L-1} |h_1[l]|^2 \right) \left( \sum_{l=0}^{L-1} |h_2[l]|^2 \right)} \quad (1)$$

where L is the number of sub-carriers and the ( )* operator denotes the conjugate operator. The higher the TRRS is, the more similar the two CFRs are, and thus the more similar the two radio biometric samples are. The TRRS based approach proposed and proved the existence of human radio biometrics and assumed that the indoor environment remains the same throughout the experiment. However, in a practical case, the indoor environment changes rapidly, leading to the varying CSI and a performance degradation due to the mismatch of CSI. This is because, the human radio biometrics are embedded in the wireless CSI which is highly correlated with the propagation environment.

To study the changing environments in a car, the CSI of an empty car is recorded for three months. In FIG. 1, it shows the CSI variation of an empty car in terms of TRRS value, calculated with the reference of day one CSI. In general, the TRRS value decreases along time, as environmental changes accumulate, leading to an environment that differs from the original one.

Figure 2:
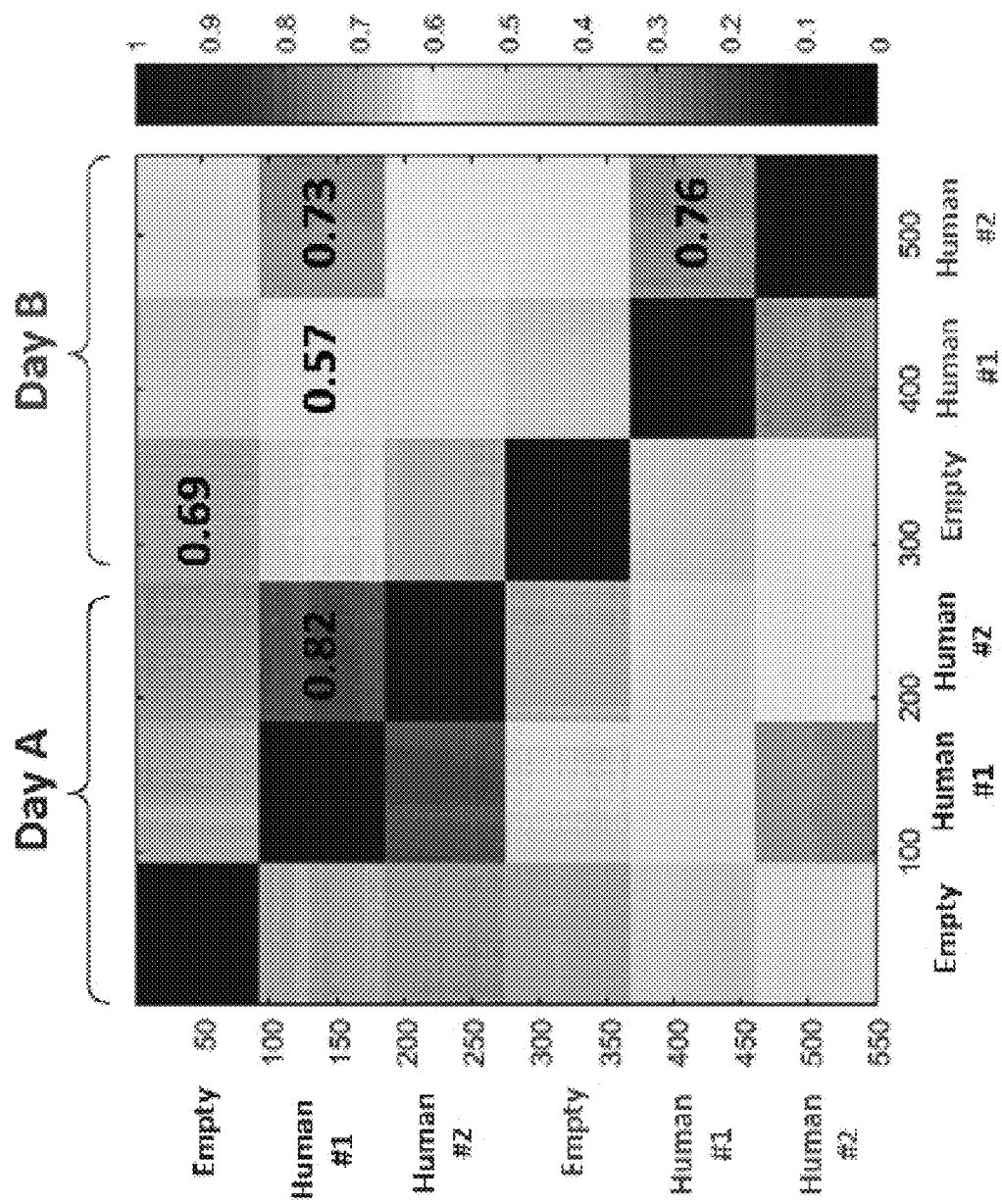
FIG. 2 illustrates exemplary experimental results of the TRRS values between the radio biometrics (channel state information) of two individuals captured at Day A and Day B when the empty car environment changes a lot as indicated by the TRRS value, according to some embodiments of the present teaching.

FIG. 2 shows the TRRS matrix between CSI collected during the radio shots of two people on two different days, A and B. The similarity of any two CSIs can be obtained from the corresponding value in the TRRS matrix. The similarity between the two empty in-car environment CSIs dropped to 0.69. Using the existing TRRS matching technique, human 2 on day B would either not be identified if there is a threshold on the similarity or would be recognized as human 1 since the TRRS between the two radio shots is higher (i.e., 0.73) than that of between the same person (i.e., 0.57). In this case, the changed environment caused a lower TRRS which lead to a mismatch. Hence, there is a need for a long term test and a broader study to understand the behavior of human radio biometrics under changing environments.

The CSI recorded at each time instant is a collection of channel information on multipaths which have different path lengths. In order to resolve the multipaths with a higher resolution, a large bandwidth may be required. Infinite resolution in the time domain requires infinite bandwidth which is not practically possible. One may achieve higher effective bandwidths by exploiting the diversity in multiple MIMO (multiple input multiple output) links as well as different frequency channels.

Figure 3:
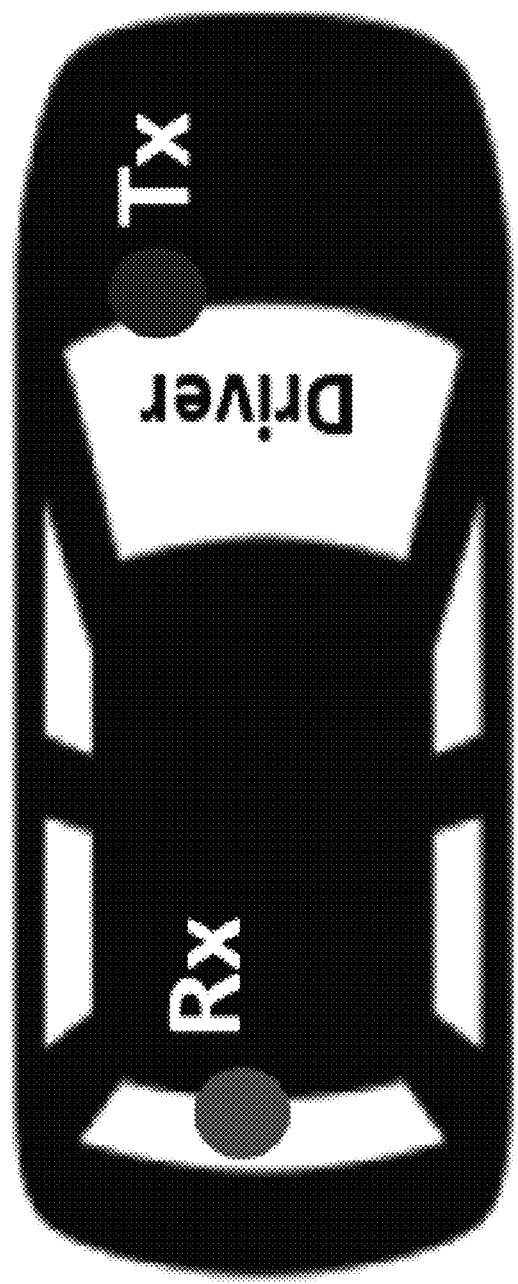
FIG. 3 illustrates an exemplary experiment setting of Smart Car with the Origin (RX) and the Bot (TX) placed inside the car, according to some embodiments of the present teaching.

In the designed scheme, one can build a human radio biometric dataset, by collecting radio shots of five people over two months. On each day, for each test subject, four radio shots are taken in the morning and evening each, in a car parked at different locations in a public parking lot. By doing so, a total of 60 different environments have been considered. The location of the Origin (RX), the Bot (TX), and the driver are as shown in FIG. 3. The goal of the designed scheme is to obtain the identity of the driver on a new day, given the radio shots from the past days/environments. The location of transceivers plays an important role in the performance of the system. Since the number of multipaths effected by the presence of the driver is relatively small, the transceiver locations may be chosen to maximize the number of multipaths passing through the driver. The transmitter may be put near the speedometer at the back of the steering wheel or may be at the audio system.

In the Smart Car, the Bot transmits channel probing signals to the Origin at a given sounding rate 1/Ts where Ts is the channel probing interval in seconds. Based on each received channel probing signal, the Origin can estimate the CSI. The radio biometrics of the individual present at the driver seat is recorded in the CSI. The Smart Car system will recognize and identify the captured radio biometrics by matching it with the radio biometrics of the authorized drivers stored in the database.

Data preprocessing: Timing and frequency synchronizations errors in the WiFi systems introduce phase offsets to the CSI. The multiple CSIs recorded for each radio shot are highly correlated with each other and thus can be used for phase compensation and outlier detection. One may compensate for the linear and the initial phase offsets. For example, let $\hat{h}_i^k$ be the received Channel Frequency Response (CFR) of the $i^{th}$ sample on the $k^{th}$ subcarrier. Let $h_i^k$ be the CFR without phase distortions. Then, $\hat{h}_i^k$ is given by the following equation:

$$\hat{h}_i^k = \text{sinc}(\pi(\Delta\varepsilon + \Delta\eta k)) h_i^k e^{j2\pi(\beta_i k + \alpha_i)}, \quad (2)$$

where $\Delta\varepsilon$ and $\Delta\eta$ are the residual errors of channel frequency offset and sampling frequency offset. $\beta_i$ and $\alpha_i$ are termed as the linear and initial phase. Assuming the argument of the sinc function is small, the linear phase is aligned with a reference CFR and is summarized below. Consider two CFRs $\hat{h}_1^k$, $\hat{h}_2^k$ and $\hat{h}_1^k$ be the reference. Then, one may have the following:

$$\hat{h}_1^k = h_1^k e^{j2\pi(\beta_1 k + \alpha_1)} \quad (3)$$

$$\hat{h}_2^k = h_2^k e^{j2\pi(\beta_2 k + \alpha_2)} \quad (4)$$

$$\delta\beta = \mathrm{argmax}_\phi |\Sigma_k \hat{h}_1^k \hat{h}_2^{k*} e^{j2\pi k \phi}| \quad (5)$$

The aligned linear phase is obtained by $h'^k_2 = h_2^k e^{-j2\pi k\delta\beta}$. The initial phase is equal to the phase of the first subcarrier on each CFR sample. It is compensated as $h_{align} = \angle \hat{h}'[0]$. If one needs to do frequency hopping over multiple channels, the phase compensation may be done for each channel separately as the phase offsets are different for different carrier frequencies.

After the phase alignment, the recorded CSI in each channel is a high dimensional complex valued vector which can be flattened to a real valued vector. With such a high dimension of features, the number of parameters that need to be learned in machine learning (ML) models is large and usually the models require a lot of data to train. Unlike computer vision techniques, obtaining large amounts of data in human identification is expensive. Hence, one may perform dimensional reduction using Principle Component Analysis (PCA) to reduce the number of parameters. PCA transforms the original features to a new feature space according to the degree of variance. One consider the number of features which contribute for 99%/89%/79% variance in the data. By doing this, the dimension of the data can be reduced.

Figure 11:
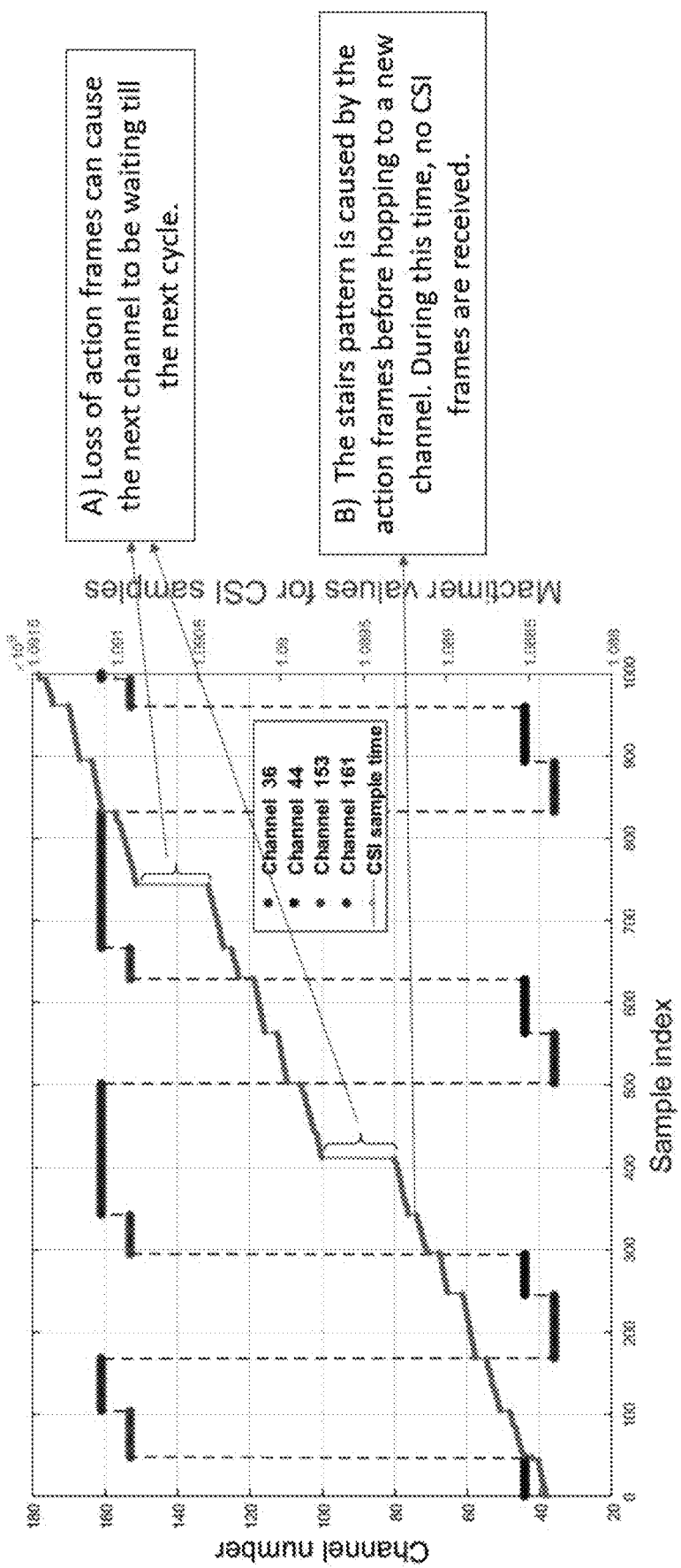
FIG. 11 illustrates an exemplary frequency hopping mechanism, according to some embodiments of the present teaching.

Frequency hopping: Wireless systems (e.g., WiFi) may transmit on one channel at any instant of time. In order to exploit the frequency diversity, one may design schemes so that the WiFi system can change channels with time. Recently, frequency hopping has been used to find the sub-nano second Time of Flight (ToF) and eventually achieve decimeter-level indoor localization. Later, centimeter-level localization has been achieved using frequency hopping by obtaining larger effective bandwidth and CSI features for WiFi fingerprinting. As an example, one may design a frequency hopping mechanism that can hop on four channels in the 5.2 GHz band. FIG. 11 demonstrates the mechanism of hopping channels at the receiver. It also shows the absolute time of arrival of the CSI frames at the receiver. The stairs like pattern is caused by the action frames before setting to a new channel during which no CSI samples are recorded. Sometimes, due to channel congestion/packet loss, all of the k action frames might be lost and the receiver continues to stay in the same channel as in regions (B). In such cases, the next channel is not set until the receiver receives action frames on the existing channel in the next cycle.

The exemplary frequency hopping algorithm is explained in Algorithm 1 and Algorithm 2. The transmitter and receiver function in parallel. The channel index is taken as ch. The transmitter sends the channel information to the receiver in specially designed frames called action frames. These are sent at regular intervals of time and the duration of each channel is specified by the user as dwell time ($\mu$). In this example, the channels may be one of $\{36, 44, 153, 161\}$.

| Algorithm 1 Frequency hopping algorithm: Transmitter |
|---|
| 1:      channel-list $\leftarrow$ $\{36, 44, 153, 161\}$ |
| 2:      ch $\leftarrow$ 0 |
| 3:      while (1) do |
| 4:         Set channel to channel-list(ch) |
| 5:         Send CSI frames as channel probing signals on channel channel-list(ch) for dwell time ($\mu$) |
| 6:         Determine the next channel index |
|          ch $\leftarrow$ (ch + 1) mod 4 |
| 7:         Next channel is channel-list(ch) |
| 8:         Construct and send k action frames with new channel index information |
| 9:      end while |

| Algorithm 2 Frequency hopping algorithm: Receiver |
|---|
| 1:      channel-list $\leftarrow$ $\{36, 44, 153, 161\}$ |
| 2:      Set channel to channel-list(0) |
| 3:      while (1) do |
| 4:         if CSI frame is received then |
| 5:           receive CSI |
| 6:         else if action frame is received then |
| 7:           Ch' $\leftarrow$ next channel extracted from action frame |
| 8:           Set channel to ch' |
| 9:         end if |
| 10:     1end While |

One can design different algorithms to guarantee the accuracy as well as the robustness of the Smart Car system.

In one example, the radio biometrics is collected through the process of radio shot and the CSI may be obtained over a bandwidth of 40 MHz in the 5.2 GHz band with 114 accessible subcarriers. During each radio shot, 90 CSIs may be collected, and they are highly correlated and can be used to remove outliers. The obtained CSI matrix per radio shot, is a complex valued matrix of dimensions 3×3×114×90.

Figure 4:
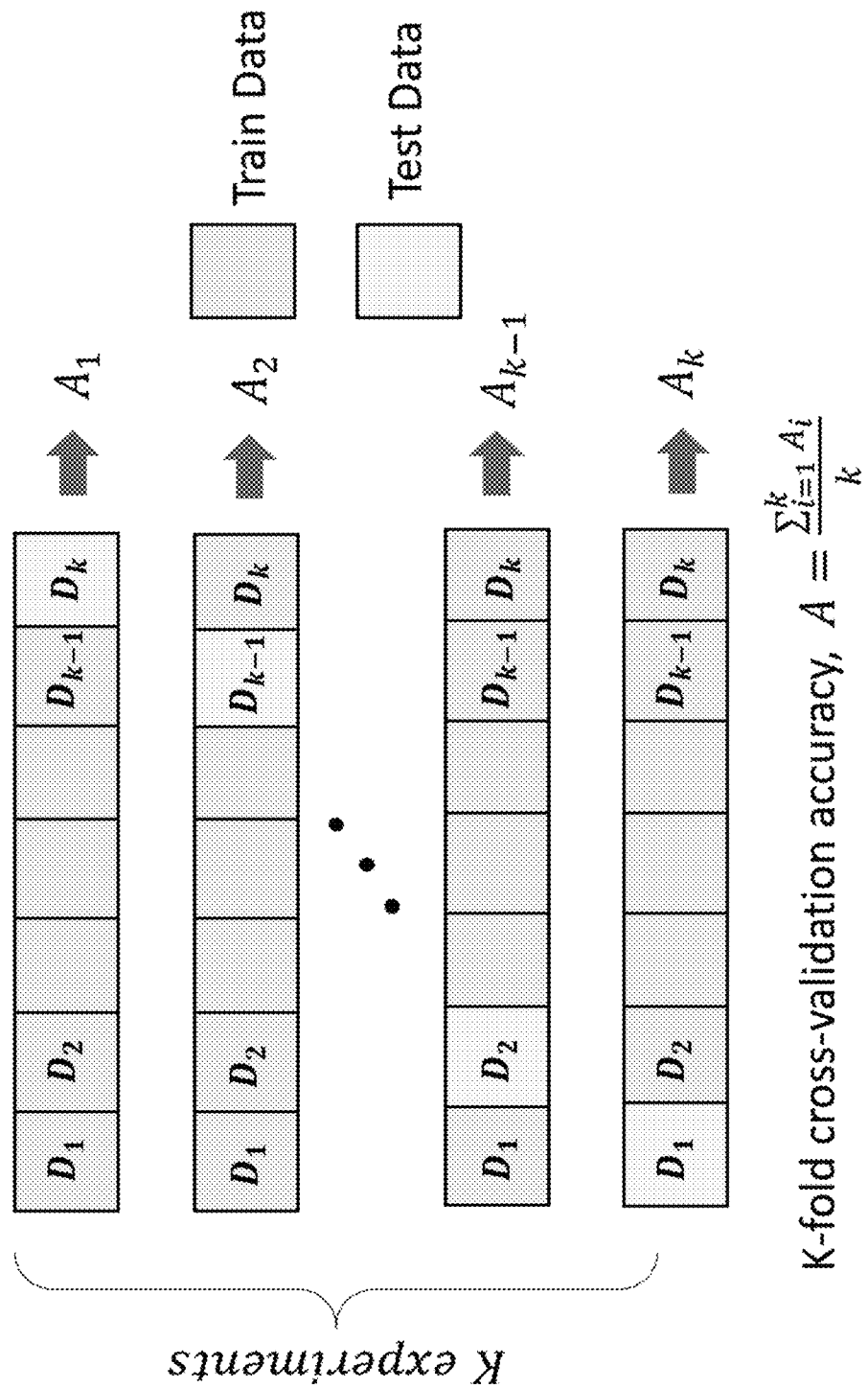
FIG. 4 illustrates an exemplary validation technique of k-fold validation that is used in the disclosed Smart Car system, according to some embodiments of the present teaching.

To evaluate the classification performance of the machine learning techniques over a limited dataset, cross-validation techniques are used. In this technique, the entire dataset is divided into K parts and K experiments are performed with each part as testing data and the remaining K−1 parts as the training data, as explained in FIG. 4. When the amount of data is limited, any particular split of train and test data, may not include all the possible variations. In such cases, the accuracy values obtained would be biased and dependent on the choice of division. K-fold validation allows us to create a more unbiased estimate of the accuracy. In this paper, the number of folds is denoted as $K_v$.

The CSIs obtained from the radio shot need to be pre-processed to eliminate the phase distortions. One can compensate for the linear and the initial phase offsets. After the phase alignment, each CSI as a 3×3×114 dimensional complex valued vector is translated to a 2052 dimensional real valued vector. With such a high dimension of feature, the number of parameters is large and machine learning techniques usually require more data to learn. Hence, one can perform dimensionality reduction using Principle Component Analysis. Considering about 99% of the variance in the data, the number of dimensions can be reduced to 90.

The first driver radio biometric dataset is built and consists of radio signatures of five people collected over a period of two months. Using this dataset, one can develop machine learning (ML) models which can adapt to in-car environmental changes and improve the accuracy of driver authentication.

Figure 5:
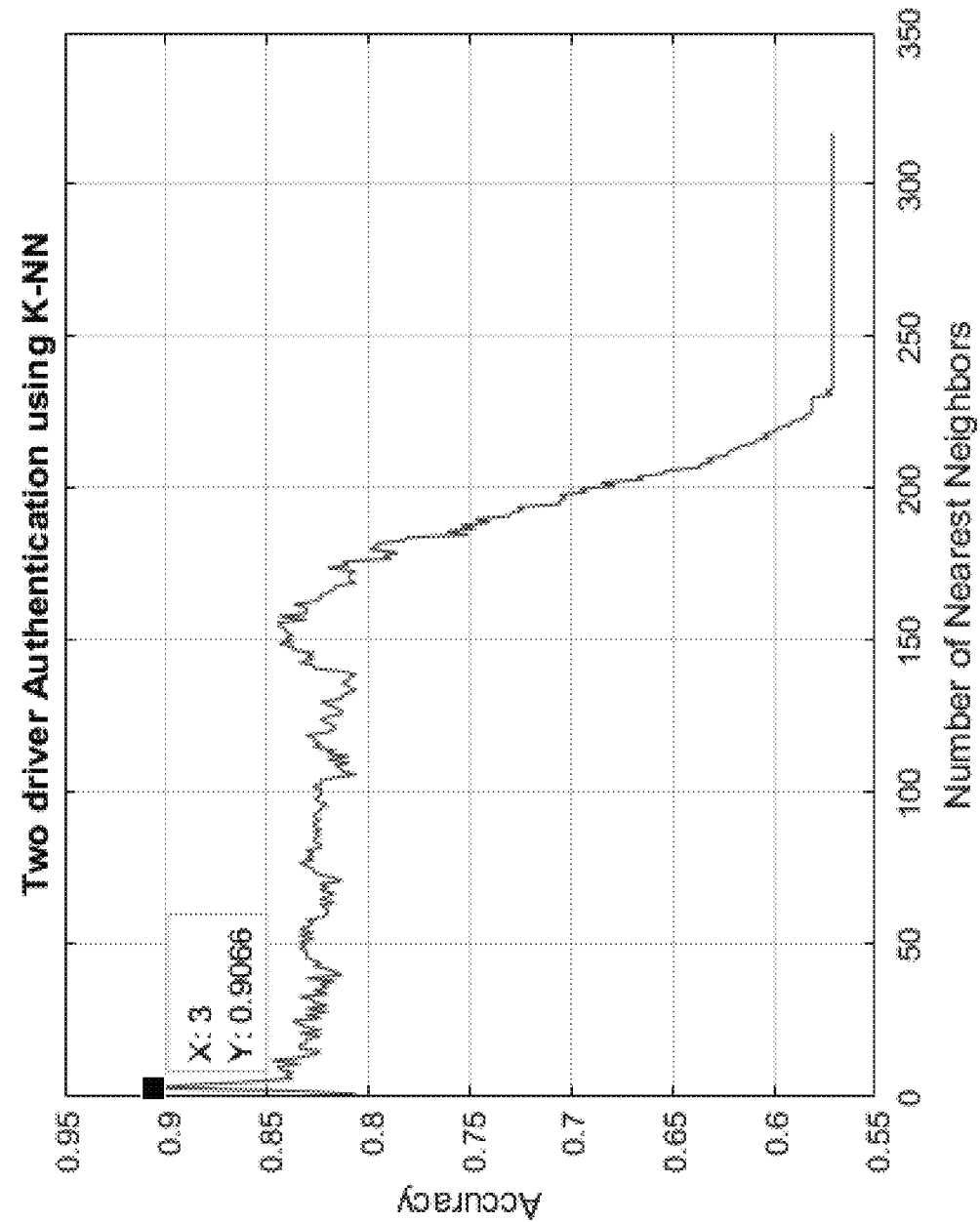
FIG. 5 illustrates exemplary experimental results of the mean of accuracies for different number of nearest neighbors adopted in the KNN evaluation method used in the disclosed Smart Car system, according to some embodiments of the present teaching.
Figure 6:
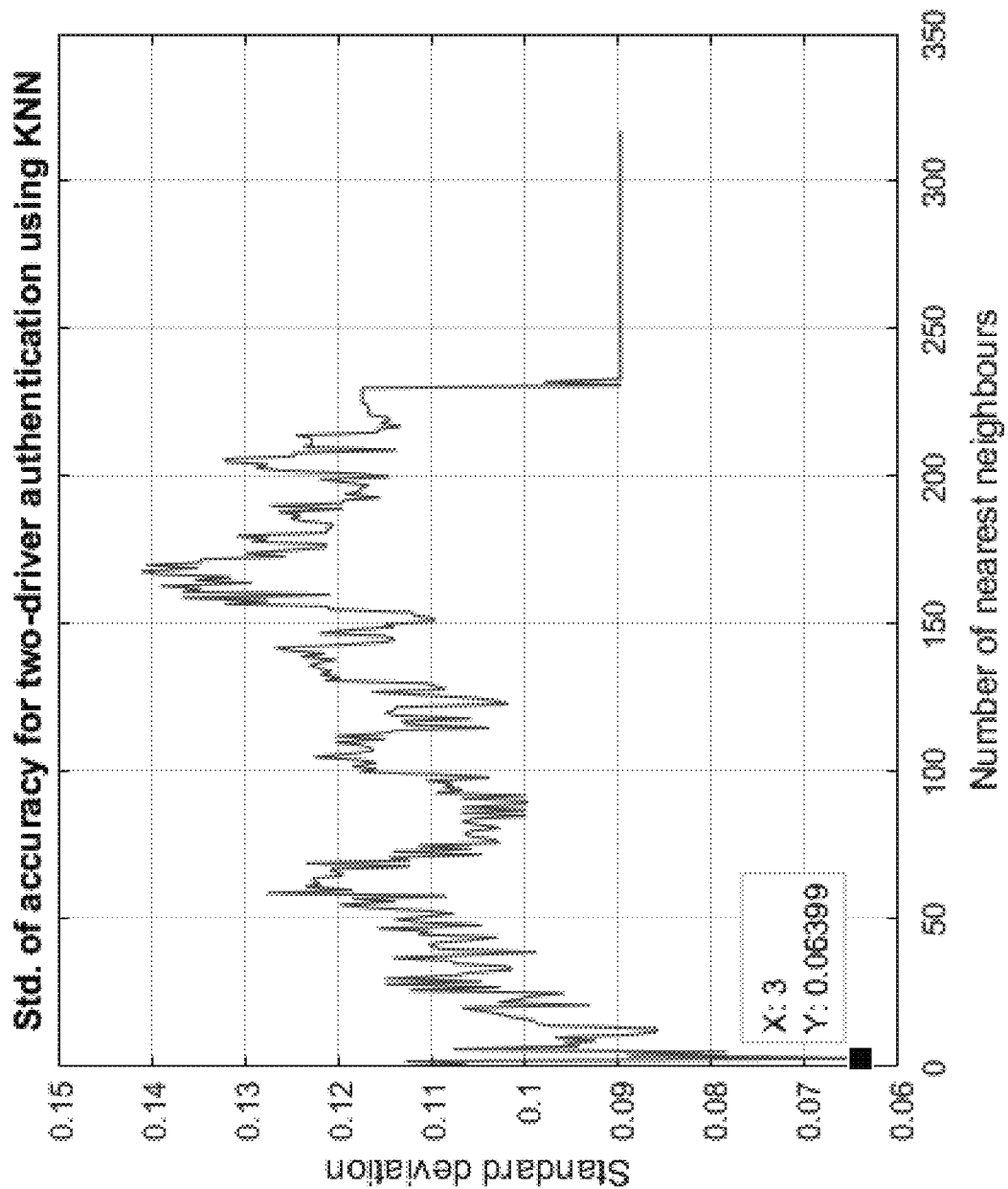
FIG. 6 illustrates exemplary experimental results of the standard deviation of accuracies for different number of nearest neighbors adopted in the KNN evaluation method used in the disclosed Smart Car system, according to some embodiments of the present teaching.

A) K-Nearest Neighbors (KNN): Every new in-car environment presents a new instance of the data to the driver authentication system. This points us to the class of instance-based learning methods, of which KNN is the most popular and the simplest one and one can use it as a baseline. For every new radio shot, one can find the closest K points from the database and assign the majority identity to the test sample. One can select the value of K based on the maximum average $K_v$-fold accuracy. FIG. 5 and FIG. 6 show the mean and standard deviation of the accuracy from $K_v$ experiments. Based on the results, one can choose the value K=3 as it has the maximum accuracy and lowest standard deviation for this particular classification.

B) Support Vector Machine (SVM): SVM technique tries to find a separating hyper plane between two classes that maximizes the margin between the plane and the closest point from either class. If the data is not linearly separable, one can use a "kernel-trick" to project the data into a very high dimensional plane using non-linear kernels. In the disclosed in-car driver authentication system, one can study the performance of SVM using both linear and radial basis function (RBF) kernels.

Figure 7:
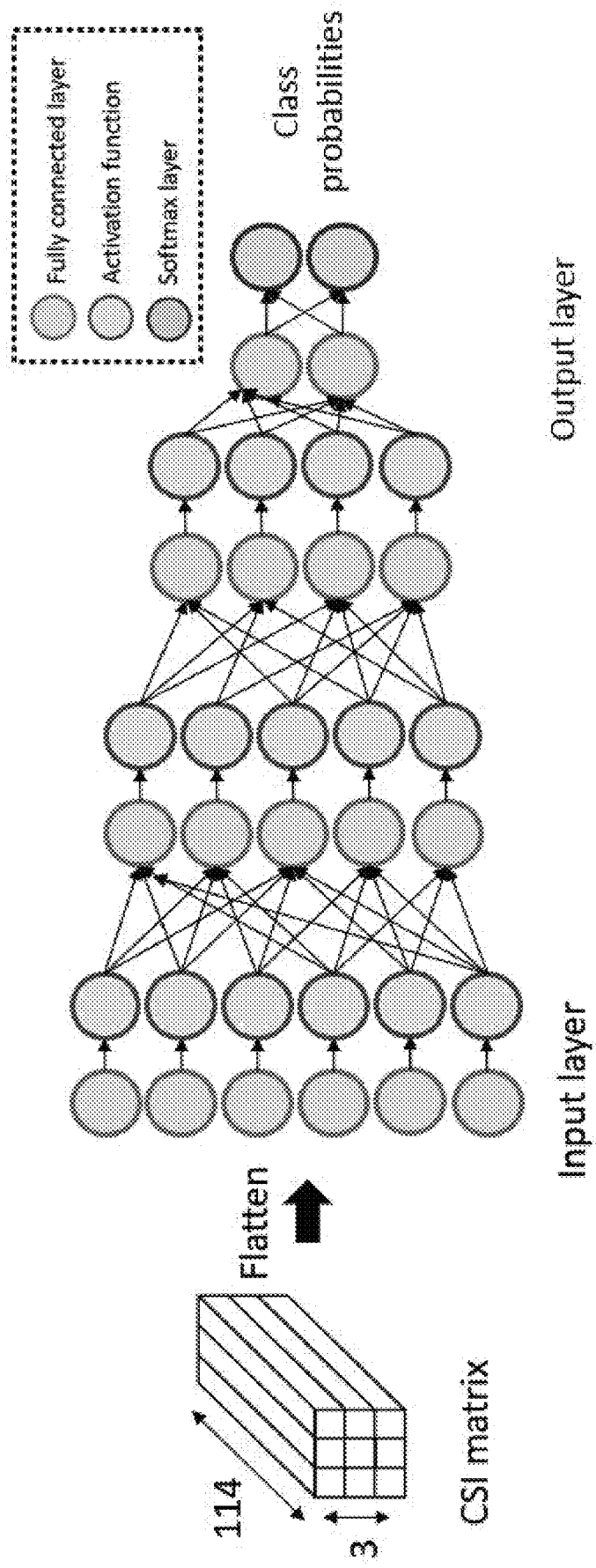
FIG. 7 illustrates exemplary neural network architecture used in the disclosed Smart Car system with two fully connected hidden layers and rectified linear unit (ReLU), according to some embodiments of the present teaching.

C) Neural Network (NN): One may want a system which is adaptive and can learn the human radio biometrics under different environments. Deep neural networks have been proved to do these tasks really well in the computer vision field. In the disclosed in-car driver authentication system, one can adopt the NN technique with ReLU activation function. The output of the network is the class probabilities which can be used to obtain the identity of the person. Dimensionality reduction is first performed over the collected radio biometrics and it allows us to use a smaller network with fewer parameters. The network architecture is shown in FIG. 7. The network consists of a input layer with number of input nodes equal to the input features, two hidden layers and an output layer which gives the class probabilities for a data point. As an example, one may adopt ReLU activation function and cross entropy loss with Adam optimizer.

The hyper parameters in the neural network may be tuned using K-fold validation technique. Consider for example, the number of training epochs. We find the classification accuracy for all the K experiments for 1000 epochs. It is observed that the model is over-fit much before 1000 epochs. One may then calculate the average performance for every epoch. The maximum value is reported as the final accuracy. Some results show that, the maximum is achieved near some epoch with a good accuracy. The number of hidden layers and hidden nodes are determined by cross validation. As we further increased the number of hidden layers or the hidden nodes, the capacity of the network increased and it began to over-fit.

Figure 8:
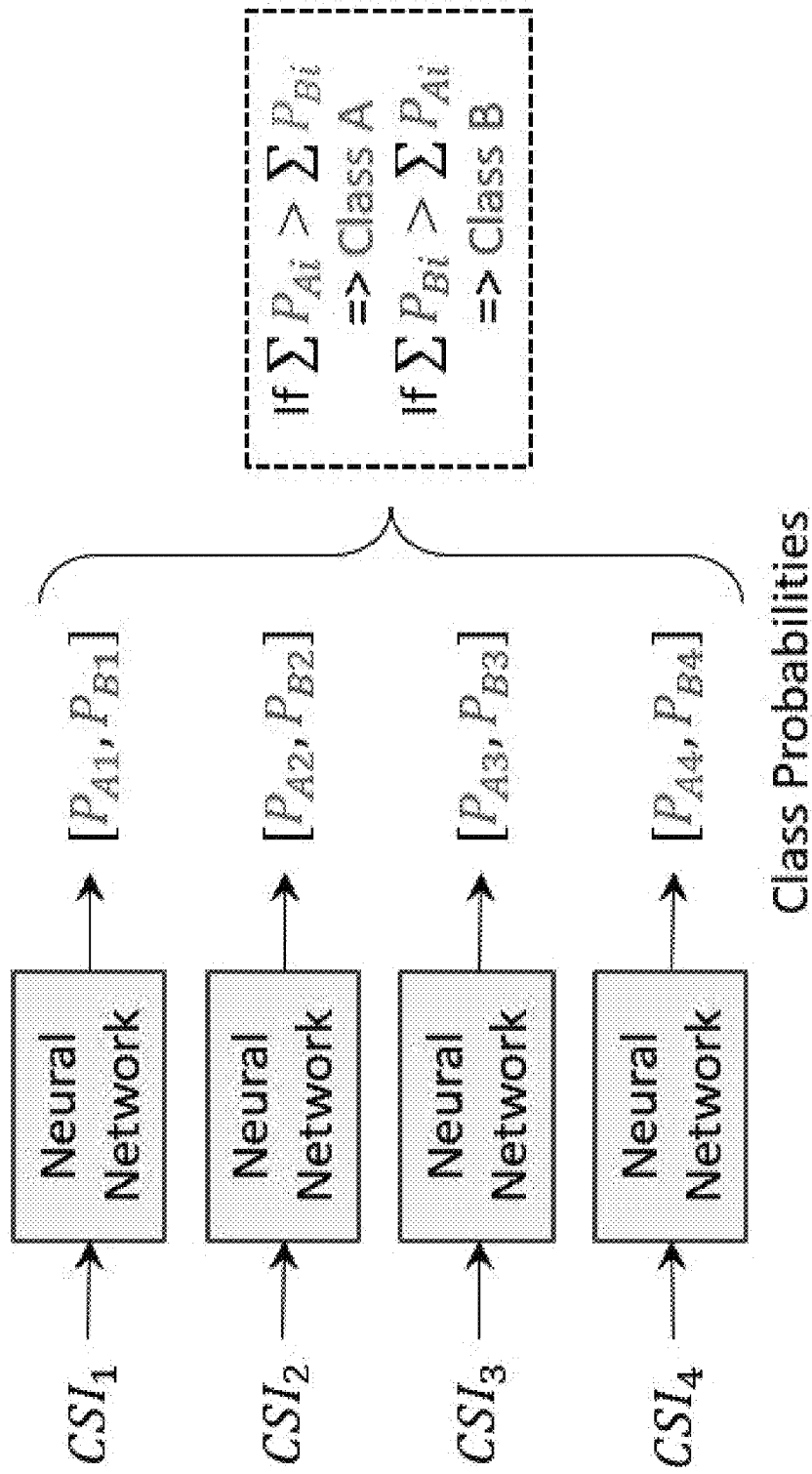
FIG. 8 illustrates exemplary the disclosed grouping mechanism for a neural network used in the disclosed Smart Car system with two fully connected hidden layers and ReLU, according to some embodiments of the present teaching.

D) Grouping: During the process of capturing the radio shot, varied seating positions of test subjects may cause minor changes in the radio signatures. This can be clearly seen even for radio shots which are taken almost at the same time i.e., with negligible change in the in-car environment. To make the system robust to such variations, one can take multiple radio shots for each test subject every time, during training and testing phases. In the testing phase, one can predict the class using all the realizations and use the combined class probabilities to obtain the driver identity. FIG. 8 explains the grouping technique in case of a neural network. For each test subject, one can collect 4 radio shots and index them as i, i=1, 2, 3, 4. Let $P_{Ai}$ and $P_{Bi}$ represent the predicted class probability of the $i^{th}$ radio shot under class A and class B, respectively. Then the identity of the test subject is determined as class A if $\Sigma P_{Ai} > \Sigma P_{Bi}$ and vice versa. The accuracy values obtained using grouping, indicate the maximum accuracy that can be achieved on a new day under a new environment.

To validate and demonstrate the idea of Smart Car driver authentication, experiments are conducted and the set-up is shown in FIG. 3 where the Origin (RX) and the Bot (TX) are put at the front and back panel in a car. The driver is sitting in front of the Bot.

One can first evaluate a two-driver-authentication scenario. In this scenario, the disclosed systems first collects and learns the radio biometrics of two drivers collected from the CSIs, and tries to differentiate between them. As a binary classification problem, it allows the system to automatically recognize one of the two registered drivers of a car and apply driver specific adjustments of the seat positions, mirrors and temperature. The car can also be used without a key and the driver authentication system can serve as a security feature.

Table 1 and Table 2 shows the $K_v$-fold accuracy values, obtained using different ML techniques and grouping, for all combinations of two drivers from the five-driver database. One can observe that in most cases, the NN approach learns better. Also, the grouping technique improves the performance of all the techniques. The best pair gives an accuracy of 99.36% and 94.88%, with and without grouping respectively. The classes A to E in the following Tables 1-3 correspond to five testers, i.e. five persons A to E, respectively.

TABLE 1

Performance on two driver authentication without grouping

| Classes | K-NN | Linear SVM | SVM-RBF | NN |
|---------|------|------------|---------|-----|
| A-B | 86.29 | 91.67 | 89.58 | 89.58 |
| A-C | 90.30 | 92.08 | 93.39 | 94.88 |
| A-D | 87.66 | 94.06 | 92.19 | 92.79 |
| A-E | 88.82 | 91.87 | 94.69 | 94.23 |
| B-C | 85.20 | 86.93 | 86.40 | 90.44 |
| B-D | 76.70 | 86.61 | 86.93 | 86.60 |
| B-E | 85.5 | 88.85 | 91.35 | 91.88 |
| C-D | 81.80 | 86.87 | 88.80 | 91.24 |
| C-E | 69.08 | 75.31 | 74.48 | 80.40 |
| D-E | 80.15 | 89.22 | 89.17 | 91.50 |

TABLE 2

Performance on two driver authentication with grouping

| Classes | KNN | SVM-Linear | SVM-RBF | NN |
|---------|-----|------------|---------|-----|
| A-B | 86.40 | 93.75 | 91.45 | 96.58 |
| A-C | 91.00 | 94.17 | 94.17 | 99.36 |
| A-D | 88.81 | 94.80 | 93.54 | 98.08 |
| A-E | 89.25 | 91.46 | 95.21 | 99.36 |
| B-C | 87.06 | 89.37 | 87.91 | 96.37 |
| B-D | 74.12 | 87.30 | 89.37 | 95.51 |
| B-E | 85.53 | 90.62 | 93.33 | 94.88 |
| C-D | 83.77 | 85.00 | 89.17 | 95.10 |
| C-E | 65.57 | 75.42 | 73.33 | 84.19 |
| D-E | 80.70 | 88.75 | 91.04 | 96.80 |

One can evaluate the disclosed Smart Car system under a single driver validation scenario. In this scenario, one can recognize one registered driver of the car. This is a one-vs-many classification problem. During the training phase, one can train the system to differentiate between person A and person B, C, D. During the testing phase, one can test if the system can differentiate person A and persons E, F. The classification accuracy obtained using RBF-SVM is 90.66%.

One can study the how the similarity of two radio biometrics will affect the performance of the disclosed Smart Car system. Two people who have higher similarity in the radio signatures in the same environment, have a lower classification accuracy. For example, in Table 3, one can show the TRRS between the radio biometrics of two individuals averaged over all environments. A lower inter-class TRRS corresponds to a higher classification accuracy.

TABLE 3

Consistency factor of the disclosed Smart Car system

| Classes | Average TRRS on same day | Accuracy % |
|---------|--------------------------|------------|
| A-E | 0.7094 | 99.36 |
| C-E | 0.7773 | 84.19 |

Figure 9:
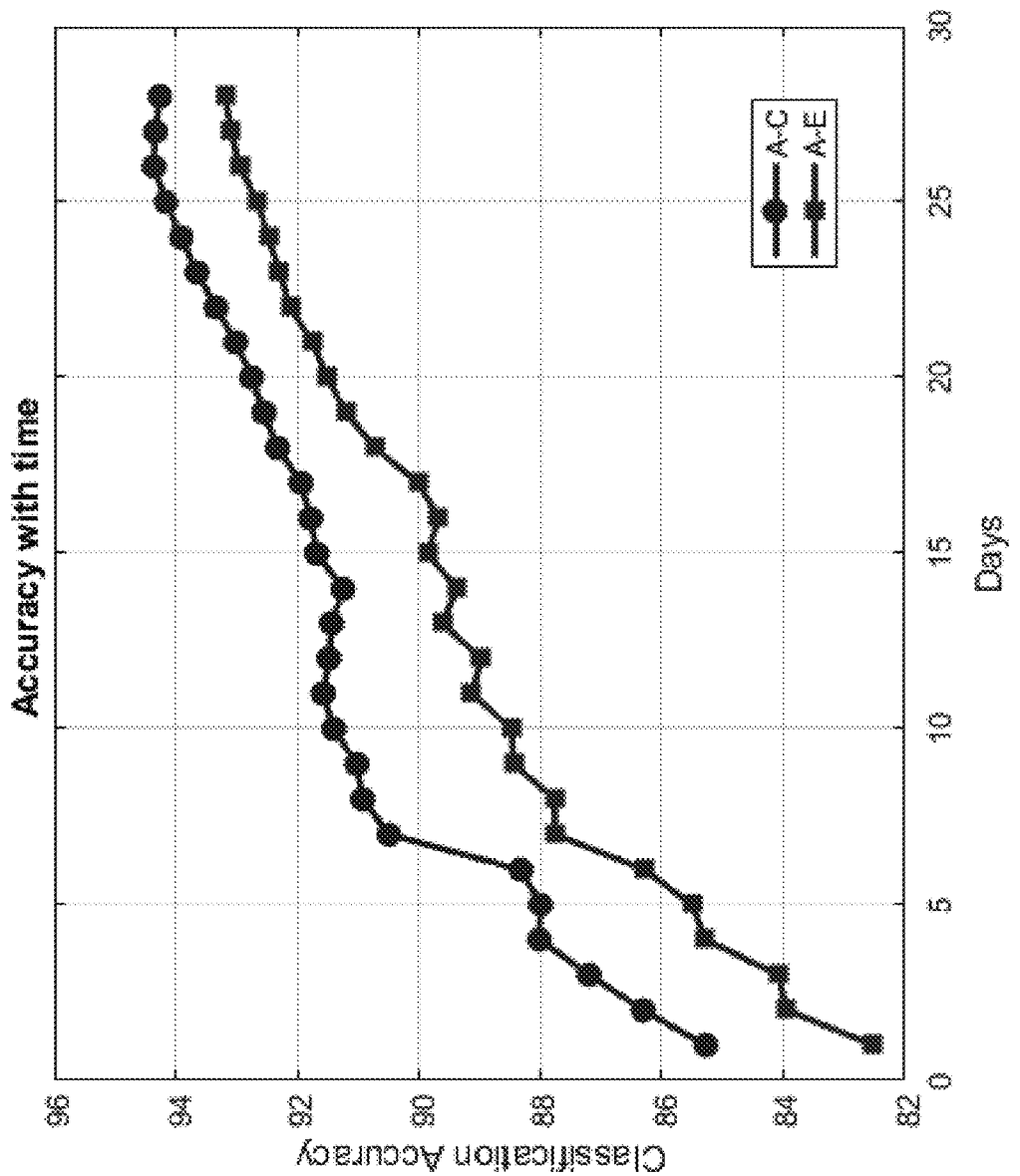
FIG. 9 illustrates exemplary experimental results of the increasing trend of the moving average of the identification accuracy for a neural network model with the training data amount increases along the time, according to some embodiments of the present teaching.

The disclosed system is 'smart', in the sense that, it learns more and more with time i.e., more data. Initially, when the data is very limited, instance based methods or SVM can be used to do the classification. When a good amount of data accumulates, one can train a NN to perform driver authentication. In FIG. 9, one can show a moving average of the performance of a NN with an increasing amount of data. The accuracy values do not show a sturdy increase because the feature contains casual time-varying pattern that depends on the new empty car environment and will only be present in the test case. Overall, the ML model learns more environment independent and human specific features with time. This became possible by training the model using radio biometrics collected from a large number of different environments present in the driver radio biometric database.

Size of the training set: generally, increasing the size of training data results in a better classification. One may evaluate the performance of the disclosed system as the size of the training set increases. In an example, for a test day s, if the size of train data is taken as d days, we use the data from (s-d) to (s-1) days to train the model. From exemplary results we see that the average performance increases till some point and then slightly begins to decrease. One of the reasons could be the inclusion of human radio biometric samples that belong to a different in-car environment with changes accumulating over time. So, for a new day, the best performance is achieved by using the data corresponding to the past 30 days as training data.

The changes in the in-car environment accumulate and the TRRS with reference on day 1 continues to decrease. This causes a decrease in the classification accuracy. Exemplary results show the classification accuracy for increasing gap between the training and testing data. We can see that with increasing difference between train and test times (days), the maximum matching TRRS and the classification accuracy decreases. As the gap increases, the in-car environment changes more and more and the classification accuracy decreases. From this observation, the best performance of the system may be achieved when it is used regularly and by constantly updating the database. The more regular and longer this system is used, the better is the performance.

Results also show that grouping technique can improve accuracy and one may use multiple radio shots for better reliability. More transmit/receive antennas can increase the accuracy. Including more training data can increase the accuracy.

A small change in the in-car environment or indoor environment, alters the multipath channel and the CSI. All the techniques based on the exact value of CSI are sensitive to these changes. For more general environments like indoor, more advanced techniques will be necessary. Also, environment independent radio biometrics cannot be obtained by direct subtraction of the CSI of empty environment but need to be dealt with in the time domain.

By utilizing the radio biometric information captured and recorded in the CSI of an in-car wireless propagation environment, different individuals present in the car can be recognized and identified. By recognizing the authorized driver, the Smart Car is providing entertainment functionality, such as applying driver specific adjustments of the seat positions, mirrors and temperature. The car can also be used without a key and the driver authentication system can serve as a security feature.

Figure 10:
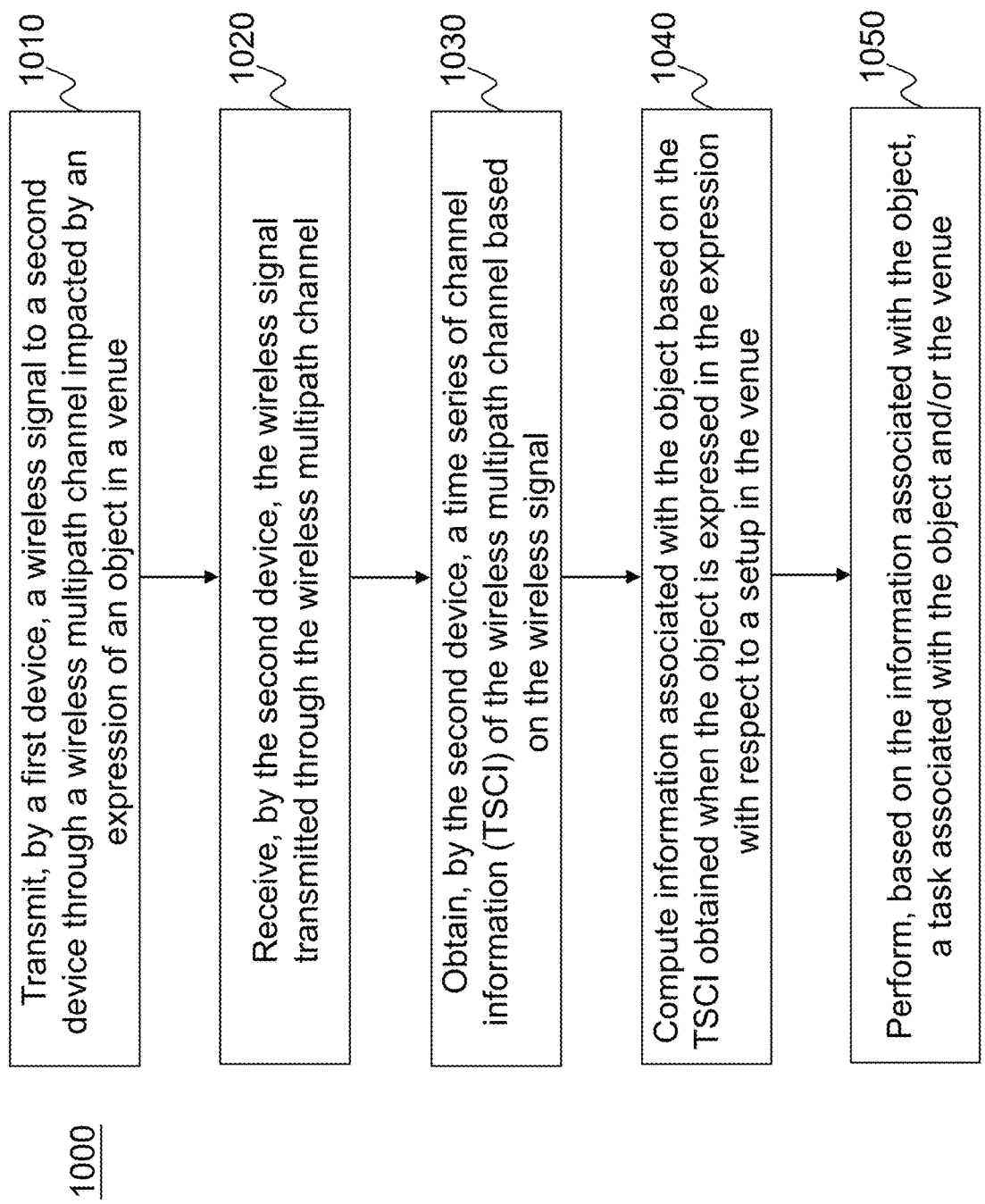
FIG. 10 illustrates a flow chart of an exemplary method for monitoring an object expression, according to some embodiments of the present teaching.

FIG. 10 illustrates a flow chart of an exemplary method 1000 for monitoring an object expression, according to some embodiments of the present teaching. At operation 1010, a first device transmits a wireless signal to a second device through a wireless multipath channel impacted by an expression of an object in a venue. In one embodiment, the object has at least one movable part and is expressed in the expression with respect to a setup in the venue. As discussed above, the expression may represent at least one of: a place in the venue, an identifiable place, a region, area, spatial coordinate, orientation, presentation, manifestation, dynamic expression, motion, static expression, positioning, scale, placement, state, gesture, pose, posture, body language, body expression, head expression, face expression, vocal expression, arm expression, hand expression, leg expression, and a sequence of expressions of the object. The first device may be a Bot; while the second device may be an Origin. In one embodiment, the venue is a vehicle, while the object is a driver of the vehicle.

At operation 1020, the second device receives the wireless signal transmitted through the wireless multipath channel. At operation 1030, the second device obtains a time series of channel information (TSCI) of the wireless multipath channel based on the wireless signal, e.g. a CSI of the wireless multipath channel.

At operation 1040, a processor computes information associated with the object based on the TSCI obtained when the object is expressed in the expression with respect to a setup in the venue. The processor may be coupled to the first device, to the second device, or both, or neither, according to various embodiments. At operation 1050, the processor performs, based on the information associated with the object, a task associated with the object and/or the venue. In one example, the venue is a vehicle, the object is a driver of the vehicle, and the setup is a seat in the vehicle. Accordingly, the task may comprise adjusting a position, legroom, or another dimension setting of the seat. In other examples, the task may comprise at least one of: adjusting an accessory or user-interface around the seat, adjusting a mirror, a display, a system, or another setting of the vehicle, communicating with a device, e.g. a smart phone, associated with the driver, communicating with another vehicle via a network, preparing for driving the vehicle, turning on or off a feature (a safety feature, a voice recognition feature, a vehicle automation feature, etc.) or a subsystem (e.g. a radio, an air conditioning, an entertainment system, a communication system, etc.) of the vehicle. In various examples, the task may be performed when the driver is detected to express a hand expression in the vehicle; or when the driver is detected to express a hand expression within a predetermined proximity of a sensor in the vehicle, wherein the hand expression can be extended to any predetermined expression.

In one embodiment, the wireless signal is transmitted based on a data from a user device, e.g. a command, instruction, or message from the user device. In another embodiment, the information associated with the object is computed repeatedly to generate analytics, wherein the analytics is provided to a user device associated with the object, e.g. to be presented on a screen of the user device. According to various embodiments, the order of the operations shown in FIG. 10 may be changed or modified.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. An apparatus in a venue for monitoring an object expression, comprising:
    a receiver configured for:
        receiving a wireless signal transmitted from a transmitter through a wireless multipath channel that is impacted by an expression of an object with respect to an adjustable setup in the venue, wherein the object has at least one movable part and the expression of the object is associated with one of a number of adjustment settings of the adjustable setup; and
    a processor configured for:
        obtaining a time series of channel information (TSCI) of the wireless multipath channel based on the received wireless signal received by the receiver, wherein the received wireless signal differs from the transmitted wireless signal due to the expression of the object associated with the adjustment setting of the adjustable setup in the venue,
        computing a radio biometric information (RBI) associated with the object based on the TSCI,
        determining multiple candidate objects,
        computing, based on the RBI, a plurality of similarity scores comprising a similarity score between the RBI and each of multiple groups of stored RBI,
        wherein each group of stored RBI is associated with a respective candidate object of the multiple candidate objects,
        wherein each stored RBI associated with a respective candidate object is pre-computed based on a respective TSCI of the wireless multipath channel obtained previously when the wireless multipath channel was impacted by a respective expression of the respective candidate object associated with a respective adjustment setting of the adjustable setup,
        determining an identity of the object based on the plurality of similarity scores,
        performing, based on the identity and the RBI associated with the object, a task associated with at least one of the object or the venue, and
        updating at least one stored RBI with the RBI, based on the identity of the object,
    wherein:
        the expression comprises at least one of: an anticipated expression, a controlled expression, a pre-determined expression, a designated expression, a targeted expression, a predicted expression, and an expected expression, the expression represents at least one of: a place in the venue, an identifiable place, a region, area, spatial coordinate, orientation, presentation, manifestation, dynamic expression, motion, static expression, positioning, scale, placement, state, gesture, pose, posture, body language, body expression, head expression, face expression, vocal expression, arm expression, hand expression, leg expression, and a sequence of expressions of the object.

2. The apparatus of claim 1, wherein:
the venue is a vehicle;
each of the transmitter and the receiver has a fixed location in the vehicle;
the object is a driver of the vehicle;
the adjustable setup is a seat of the vehicle;
the adjustment settings are different seating positions of the seat; and
the processor is further configured for: performing a feature extraction to extract a feature from the TSCI, wherein:
the RBI associated with the object is computed based on the feature extracted from the TSCI,
the feature extraction is performed based on at least one of:
a projection, principal component analysis (PCA), eigen-decomposition, singular value decomposition (SVD), time-frequency decomposition, vector quantization, machine learning, neural network,
recognition, verification, identification, authentication, locationing, or tracking of at least one of: motion, fall-down, or human biometrics.

3. The apparatus of claim 2, wherein:
the receiver is further configured for obtaining at least one training TSCI during a training period in which a training object similar to the object is expressed in the expression in the venue; and
the processor is further configured for training the feature extraction based on the at least one training TSCI.

4. The apparatus of claim 2, wherein the processor is further configured for:
changing the feature extraction based on a recent window of channel information in the TSCI;
extracting a new feature from the TSCI based on the changed feature extraction;
computing a new information associated with the object based on at least one of: the TSCI, the new feature and the changed feature extraction, wherein changing the feature extraction comprises at least one of:
changing a quantity of features,
changing feature definition,
changing feature precision,
changing feature representation,
processing the feature,
retraining the feature extraction,
recomputing the feature extraction,
renewing the feature extraction,
synchronizing the changed feature extraction,
updating the feature extraction,
modifying the feature extraction,
adjusting the feature extraction,
expanding the feature extraction,
reducing the feature extraction, or
simplifying the feature extraction.

5. The apparatus of claim 2, wherein the feature is a biometric feature derived from the TSCI.

6. The apparatus of claim 5, wherein the machine learning model is trained based on a neural network.

7. The apparatus of claim 6, wherein:
the receiver is further configured for obtaining the at least one training TSCI during the training period in which a training object similar to the object is expressed in the expression in the venue.

8. The apparatus of claim 1, wherein the processor is further configured for changing, based on a recent window of channel information in the TSCI, the machine learning model and a parameter associated with the TSCI, wherein the changing comprises at least one of:
changing a particular parameter of at least one of: the neural network, the model, and the algorithm,
changing parameter precision, changing parameter representation,
changing at least one of: an input layer, a hidden layer, and an output layer, of the neural network,
changing a at least one of: a neuron, a node, a connection, an interconnection, a structure, a layer, an input layer, a hidden layer, an output layer, and an organization, of the neural network,
changing at least one of: a weight, a weighted sum, and a propagation function, of the neural network,
changing the model definition,
changing at least one element of the model,
changing the algorithm definition,
changing at least one step of the algorithm,
retraining, recomputing, renewing, synchronizing, updating, modifying, adjusting, expanding, reducing, or simplifying.

9. The apparatus of claim 8, wherein:
the setup is a seat; and
the object is at least one of: a driver, operator, officer, or passenger, sitting on the seat in the vehicle.

10. The apparatus of claim 9, wherein:
the task comprises at least one of:
adjusting at least one of: a position, legroom, height, width, length, angle, lumber support, firmness, armrest, head support, neck support, comfort setting, heating setting, health-related setting, ergonomic setting, and another setting, of the seat,
adjusting at least one of: a system, accessory and user-interface, around the seat,
adjusting at least one of: rear-view mirror, side mirror, steering wheel, steering column, dash panel, display, control panel, on-screen display, entertainment system, levers, and buttons,
communicating with at least one of: a device, smart device, smart phone, communicating device, tablet, laptop, computer, Bluetooth device, WiFi device, mesh device, LTE device, associated with the object,
communicating with at least one of: a network, wireless network, WiFi network, mesh network, 3G/4G/LTE/5G/6G/7G/8G network, garage, parking facility, refueling facility, storage facility, charging device, power transfer facility, smart device, facility automation system, home, house, building, facility, warehouse, factory, security system, remote device, remote server, another networked vehicle, and another networked device,
preparing for driving,
turning on at least one of: a device, and subsystem, of the vehicle,
adjusting at least one of: radio, streaming service, news, information source, information display, voice recognition, dialogue system, vehicle automation system, engine, lights, air conditioning, comfort features, safety features, cabin monitoring, entertainment system, communication system, and a subsystem of the vehicle, or making an adjustment of at least one of: the vehicle, and the setup, such that the object is expressed in another expression based on the adjustment.

11. The apparatus of claim 8, wherein:
a second transmitter is configured for transmitting a second wireless signal asynchronously through the wireless multipath channel in the venue; and
a second receiver is configured for:
receiving the second wireless signal through the wireless multipath channel, and
obtaining a second TSCI of the wireless multipath channel asynchronously based on the second wireless signal.

12. The apparatus of claim 11, wherein at least one of the second transmitter and the second receiver is part of a transceiver that covers one of the transmitter and the receiver.

13. The apparatus of claim 11, wherein the processor is further configured for:
computing a second information associated with the object individually based on the second TSCI; and
combining the RBI computed based on the TSCI and the second information computed based on the second TSCI.

14. The apparatus of claim 11, wherein the processor is configured for:
computing the RBI associated with the object jointly based on the TSCI and the second TSCI.

15. A system for monitoring an object expression, comprising:
a first transceiver configured for transmitting a wireless signal through a wireless multipath channel that is impacted by an expression of an object with respect to an adjustable setup in a venue, wherein the object has at least one movable part and the expression of the object is associated with one of a number of adjustment settings of the adjustable setup;
a second transceiver configured for:
receiving the wireless signal through the wireless multipath channel
and
a processor configured for:
obtaining a time series of channel information (TSCI) of the wireless multipath channel based on the received wireless signal received by the second transceiver, wherein the received wireless signal differs from the transmitted wireless signal due to the expression of the object associated with the adjustment setting of the adjustable setup in the venue,
computing a radio biometric information (RBI) associated with the object based on the TSCI,
determining multiple candidate objects,
computing, based on the RBI, a plurality of similarity scores comprising a similarity score between the RBI and each of multiple groups of stored RBI,
wherein each group of stored RBI is associated with a respective candidate object of the multiple candidate objects,
wherein each stored RBI associated with a respective candidate object is pre-computed based on a respective TSCI of the wireless multipath channel obtained previously when the wireless multipath channel was impacted by a respective expression of the respective candidate object associated with a respective adjustment setting of the adjustable setup,
determining an identity of the object based on the plurality of similarity scores,
performing, based on the identity and the RBI associated with the object, a task associated with at least one of the object or the venue, and
updating at least one stored RBI with the RBI, based on the identity of the object.

16. The system of claim 15, further comprising:
a sensor configured for receiving an input associated with the object,
wherein the processor is further configured for computing, based on the input associated with the object, at least one of: a prediction, a reference information and an auxiliary information,
wherein the RBI associated with the object is computed based on the TSCI and at least one of: the prediction, the reference information and the auxiliary information.

17. A method, implemented by a processor, a memory communicatively coupled with the processor, and a set of instructions stored in the memory to be executed by the processor for monitoring an object expression, comprising:
obtaining a time series of channel information (TSCI) of a wireless multipath channel based on a wireless signal, wherein
the wireless signal is transmitted from a first wireless device to a second wireless device through the wireless multipath channel that is impacted by an expression of an object with respect to an adjustable setup in a venue,
the object has at least one movable part, and
the expression of the object is associated with one of a number of adjustment settings of the adjustable setup;
computing a radio biometric information (RBI) associated with the object based on the TSCI;
determining multiple candidate objects;
computing, based on the RBI, a plurality of similarity scores comprising a similarity score between the RBI and each of multiple groups of stored RBI,
wherein each group of stored RBI is associated with a respective candidate object of the multiple candidate objects,
wherein each stored RBI associated with a respective candidate object is pre-computed based on a respective TSCI of the wireless multipath channel obtained previously when the wireless multipath channel was impacted by a respective expression of the respective candidate object associated with a respective adjustment setting of the adjustable setup;
determining an identity of the object based on the plurality of similarity scores;
performing, based on the identity and the RBI associated with the object, a task associated with at least one of the object or the venue; and
updating at least one stored RBI with the RBI, based on the identity of the object,
wherein:
the expression represents at least one of: a place in the venue, an identifiable place, a region, area, spatial coordinate, orientation, presentation, manifestation, dynamic expression, motion, static expression, positioning, scale, placement, state, gesture, pose, posture, body language, body expression, head expression, face expression, vocal expression, arm expression, hand expression, leg expression, and a sequence of expressions of the object, the stored radio biometrics are trained using a machine learning model based on radio biometrics collected during a training period.

18. The method of claim 17, further comprising:

computing the RBI repeatedly;

communicating a data to at least one of: the first wireless device, the second wireless device, a server, a local server, a cloud server, and a user device, in at least one of: a direct manner and an indirect manner, wherein the data comprises at least one of: the TSCI, an analysis of the TSCI, a data associated with the TSCI, the repeatedly computed information, an analysis of the information, a data associated with the information, a history of the information, a time trend of the information, a behavior of the information, a change, a second information computed based on the continuously computed information, a summary of the task, a report of task, a data associated with the task, an analysis of the task, and a data associated with an outcome of the task; and providing, to a user device associated with the object, an analytics computed based on the data.

19. The method of claim 17, further comprising configuring the first wireless device and the second wireless device such that:

the wireless signal transmitted through the multipath channel is compatible with at least one of:
- a standard, wireless local area network (WLAN) standard, wireless communication standard, mobile communication standard, wireless network standard,
- an international standard, national standard, industry standard, defacto standard,
- an IEEE standard, IEEE 802 standard, 802.11, 802.11n, 802.11ac, 802.11ax, 802.11be, 802.15, 802.16, WiFi standard, mesh,
- 3GPP standard, LTE, 3G, 4G, 5G, 6G, 7G, 8G, UWB, Bluetooth, BLE, RFID, and another standard;

the wireless signal comprises at least one of:
- a wireless communication signal, mobile communication signal, wireless network signal, mobile network signal, mesh signal, light signal, light communication, downlink signal, uplink signal, broadcast signal, multicast signal, unicast signal, bandlimited signal, standard compliant signal, wireless standard compliant signal,
- a protocol signal, standardized wireless protocol, communication protocol, wireless communication network signal, cellular network signal, beacon signal, beacon wireless signal, pilot signal, probe signal, acknowledgement signal, response signal, reply signal, reference signal, source signal, wireless source signal, motion probes, motion detection signal, motion sensing signal, synchronization signal,
- a standard compliant wireless frame, management frame, control frame, data frame, data frame with null data, 802.11 frame, 802.15 frame, 802.16 frame, LTE frame, 4G frame, 5G frame, 6G frame,
- a 3GPP signal, LTE/3G/4G/5G/6G/7G/8G signal, WiFi signal, IEEE 802 signal, IEEE 802.11/15/16 signal, RFID signal, Bluetooth signal, BLE signal, UWB signal, Zigbee signal, WiMax signal, an RF signal in licensed band, an RF signal in unlicensed band, an RF signal in ISM band;

the wireless signal has a bandwidth and a carrier frequency supported by both the first wireless device and the second wireless device; and the wireless signal is transmitted with N1 antennas of the first wireless device and received with N2 antennas of the second wireless device.

\* \* \* \* \*